(12) United States Patent
Brumley et al.

(10) Patent No.: US 7,542,374 B2
(45) Date of Patent: Jun. 2, 2009

(54) SYSTEM AND METHOD FOR ACOUSTIC DOPPLER VELOCITY PROCESSING WITH A PHASED ARRAY TRANSDUCER INCLUDING APPLYING CORRECTION FACTORS TO VELOCITIES ORTHOGONAL TO THE TRANSDUCER FACE

(75) Inventors: Blair H. Brumley, La Jolla, CA (US); Mark A. Vogt, San Diego, CA (US)

(73) Assignee: Teledyne RD Instruments, Inc., Poway, CA (US)

( * ) Notice: Subject to any disclaimer, the term of this patent is extended or adjusted under 35 U.S.C. 154(b) by 252 days.

(21) Appl. No.: 11/540,997

(22) Filed: Sep. 28, 2006

(65) Prior Publication Data
US 2008/0080314 A1 Apr. 3, 2008

(51) Int. Cl.
*G01S 15/58* (2006.01)
(52) U.S. Cl. .......................................................... 367/90
(58) Field of Classification Search .................... 367/89, 367/90, 902; 701/21; 702/96, 103, 143; 73/861.23
See application file for complete search history.

(56) References Cited

U.S. PATENT DOCUMENTS

| | | |
|---|---|---|
| 2,404,391 A | 7/1946 | Mason |
| 3,419,845 A | 12/1968 | Thiede et al. |
| 3,603,920 A | 9/1971 | Stedtnitz |
| 3,794,964 A | 2/1974 | Katakura |
| 4,062,237 A | 12/1977 | Fox |
| 5,043,951 A | 8/1991 | Gilmour et al. |
| 5,122,990 A | 6/1992 | Deines et al. |
| 5,208,785 A | 5/1993 | Brumley et al. |
| 5,315,562 A | 5/1994 | Bradley et al. |
| 5,343,443 A | 8/1994 | Merewether |
| 5,381,384 A | 1/1995 | Winge |
| 5,521,883 A | 5/1996 | Fage et al. |
| 5,615,173 A | 3/1997 | Brumley |
| 5,689,445 A | 11/1997 | Vogt et al. |
| 5,808,967 A | 9/1998 | Yu et al. |
| 5,923,281 A | 7/1999 | Vopat |

(Continued)

FOREIGN PATENT DOCUMENTS

GB          2128833 A          5/1982

(Continued)

OTHER PUBLICATIONS

"Technical Note: RDI'S Phased Array Technology", RD Instruments: Acoustic Doppler Solutions, Feb. 28, 2003.*

(Continued)

*Primary Examiner*—Dan Pihulic
(74) *Attorney, Agent, or Firm*—Knobbe Martens Olson & Bear LLP

(57) ABSTRACT

A system and method for measuring velocity in a fluid medium utilizing a phased array transducer are disclosed. The phased array transducer comprises a plurality of transducer elements arranged to form a single two-dimensional array. In one aspect, the method comprises receiving echoes of a plurality of beams generated by the transducer, calculating raw velocity estimates based at least in part on the echoes, and removing substantially a bias related to a first velocity from the raw velocity estimates. The first velocity is orthogonal to the face of the two-dimensional array.

15 Claims, 14 Drawing Sheets

U.S. PATENT DOCUMENTS

| | | | |
|---|---|---|---|
| 5,923,617 | A | 7/1999 | Thompson et al. |
| 6,052,334 | A | 4/2000 | Brumley et al. |
| 6,097,671 | A | 8/2000 | Merewether |
| 6,108,275 | A | 8/2000 | Hughes et al. |
| 6,176,829 | B1 | 1/2001 | Vilkomerson |
| 6,282,151 | B1 | 8/2001 | Brumley et al. |
| 6,647,804 | B1 | 11/2003 | Deines |
| 6,678,210 | B2 | 1/2004 | Rowe |
| 6,700,834 | B2 | 3/2004 | Brumley et al. |
| 6,714,482 | B2 | 3/2004 | Rowe |
| 6,820,008 | B1 | 11/2004 | van Smirren et al. |
| 7,007,555 | B2 | 3/2006 | Strong et al. |
| 7,317,660 | B2 * | 1/2008 | Brumle et al. ............... 367/90 |
| 7,379,387 | B2 * | 5/2008 | Strong et al. ................. 367/89 |
| 2002/0018400 | A1 * | 2/2002 | Brumley et al. .............. 367/90 |
| 2004/0184350 | A1 | 9/2004 | Brumley et al. |
| 2005/0199056 | A1 * | 9/2005 | Strong et al. ............ 73/170.29 |
| 2006/0155492 | A1 * | 7/2006 | Strong et al. ................. 702/76 |
| 2008/0080313 | A1 * | 4/2008 | Brumley et al. .............. 367/89 |
| 2008/0080314 | A1 * | 4/2008 | Brumley et al. .............. 367/89 |
| 2008/0080315 | A1 * | 4/2008 | Vogt ............................ 367/90 |
| 2008/0094940 | A1 * | 4/2008 | Brumley et al. .............. 367/90 |
| 2008/0308343 | A1 * | 12/2008 | Vogt .......................... 181/142 |

FOREIGN PATENT DOCUMENTS

| | | |
|---|---|---|
| JP | 10197549 | 7/1998 |
| JP | 2948472 B2 | 7/1999 |
| WO | WO 98/15846 A | 4/1998 |

OTHER PUBLICATIONS

Odegaard, Oyvind, "Application Potential, Error Considerations and Post-Processing Software for ADCP Deployments on AUVs", Oceans '04, MTTS/IEEE Techno-Ocean 2004, pp. 1435-1443, vol. 3, Nov. 9-12, 2004.*

U.S. Appl. No. 09/006,088, filed Aug. 20, 2001, Brumley et al.

Allender, et al., "The WADIC Project: A Comprehensive Field Evaluation of Directional Wave Instrumentation," *Ocean Engineering*, 16(56): 505-536 (1989).

Frazier, et al., "Analysis of resolution for an amplitude steered array," *IEEE Ultrasonics Symposium* pp. 1231-1234 (1999).

Frazier, "A two-dimensional amplitude-steered array for real-time volumetric imaging," *Doctoral Thesis*, University of Illinois at Urbana-Champaign, pp. 170 (Apr. 2000).

Glad, et al., "The maximum-likelihood property of estimators of wave parameters from heave, pitch, and roll buoys," *American Meteorological Society*, 9(2):169-173 (1992).

Hashimoto, et al., "Improvement of submerged Doppler-type directional wave meter and its application to field observations," *Coastal Engineering*, pp. 629-642 (1996).

Haug, et al., "Estimation of Directional Spectra by ML/ME Methods," *Proc. Ocean Wave Measurement and Analysis*, pp. 394-405 (Jul. 1993).

Herbers, et al., "Field Verification of Acoustic Doppler Surface Gravity Wave Measurements," *Journal of Geophysical Research* 96(C9): 17,023-17,035 (1991).

Hughes, et al., "Tilted directional response patterns formed by amplitude weighting and a single 90° phase shift," *J. Acoust. Soc. Am.*, 59(5): 1040-1045 (May 1976).

Kirlin, "Estimation of Transfer Function Parameters with Output Fourier Transform Sensitivity Vectors," *1997 IEEE International Conference on Acoustics, Speech, and Signal Processing* (Cat. No. 97CB36052) Munich, Germany, Apr. 21-24, 1997, pp. 3933-3936, vol. 5.

Krogstad, et al., "High-resolution directional wave spectra from horizontally mounted acoustic Doppler current meters," *Journal of Atmospheric and Oceanic Technology* 5(4): 340-352 (1988).

Krogstad, "Maximum Likelihood Estimation of Ocean Wave Spectra from General Arrays of Wave Gauges," *Modeling, Identification, and Control*, 9(2): 81-97 (1988).

Mechler, "A line hydrophone with frequency dependent beam steering," *Masters Thesis*, University of Texas, pp. 135 (Aug. 1957).

Pinkel, et al., "Open ocean surface waves measurement using Doppler sonar," *Journal of Geophysical Research*, 92(C12): 12,967-12,973 (1987).

Smith, "Doppler sonar and surface waves: range and resolution," *Journal of Atmospheric and Oceanic Technology*, 6: 680-696 (1989).

Smith, et al., "Directional surface wave estimates from Doppler sonar data," *Journal of Atmospheric and Oceanic Technology*, 12: 617-632 (1995).

Stockhausen, "Directional wave spectra using an acoustic Doppler current profiler," *Thesis*, Library of the Virginia Institute of Marine Science (1994).

Takayama, et al., "Development of a submerged Doppler-type directional wave meter," *Coastal Engineering* 624-634 (1994).

Terray, et al., "Measuring Waves and Currents With an Upward-Looking ADCP," *IEEE* 66-71 (1999).

Terray, et al., "Measuring Wave Height and Direction Using Upward-Looking ADCPs," *Oceans '97*, MTS/IEEE Conference Proceedings (Cat. No. 97 CH36105). Halifax, NS, Canada, Oct. 6-9, 1: 287-290 (1999).

Terray, et al., "Measuring wave height and direction using upward-looking ADCP's," *IEEE Oceans '97*, pp. 1-4 (1997).

Terray, et al., "Measuring wave direction using upward-looking Doppler sonar," *Proceedings of the IEEE Fourth Working Conference on Current Measurement* pp. 1-6 and Fig. 1-Fig. 4.

Trevorrow, et al., "Extraction of Ocean Wave Directional Spectra Using Steerable Doppler Side-Scan Sonars," *Am. Meteorological Society*, pp. 1087-1100 (Oct. 1995).

Trevorrow, "Measurement of Ocean Wave Directional Spectra Using Doppler Side-Scan Sonar Arrays," *Am. Meteorological Society*, pp. 603-616 (Jun. 1995).

Visbeck, et al., "Sea surface conditions remotely sensed by upward-looking ADCP's," *Journal of Atmospheric and Oceanic Technology*, 12: 141-149 (1995).

Zedel, "Deep ocean wave measurements using a vertically oriented sonar," *Journal of Atmospheric and Oceanic Technology*, 11: 182-191 (1994).

079782 Invitation to Pay Additional Fees for PCT/US2007/079782, dated May 19, 2008.

Office Action received from the United States Patent and Trademark Office, dated Jul. 18, 2008, for U.S. Appl. No. 11/529,786.

Rehmel et al, "Tethered Acoustic Current Doppler Profiler Platforms for Measuring Streamflow," Open-file Report 02-237, US Department of Interior, 2003.

Lee et al., Golay codes for simultaneous multi-mode operation in phased arrays, Proceedings of the Ultrasonics Symposium. Oct. 1982, pp. 821-825, vol. 2, No. 2, IEEE, New York.

International Search Report and Written Opinion dated Mar. 20, 2009 for PCT/US2007/079782.

* cited by examiner

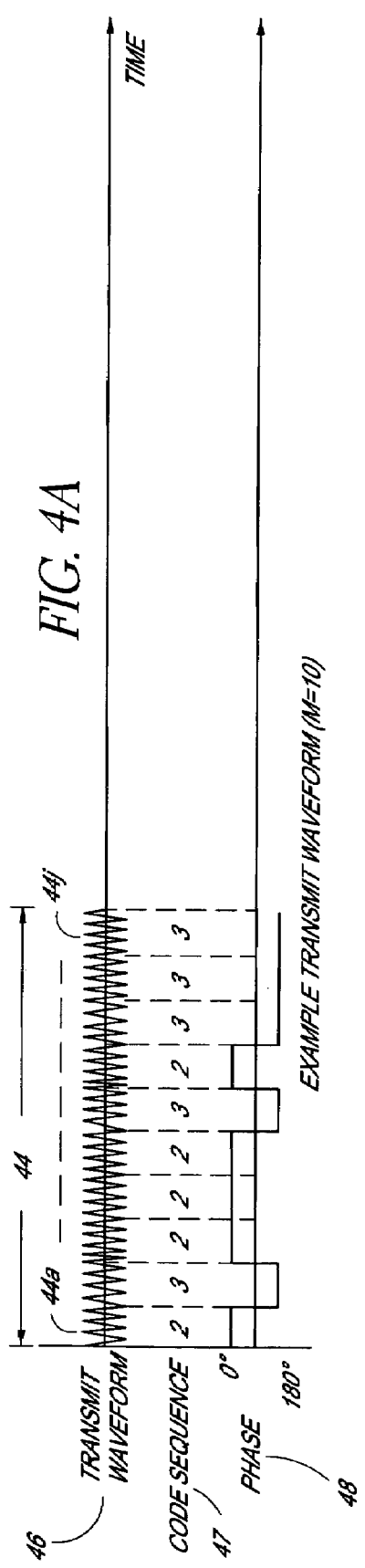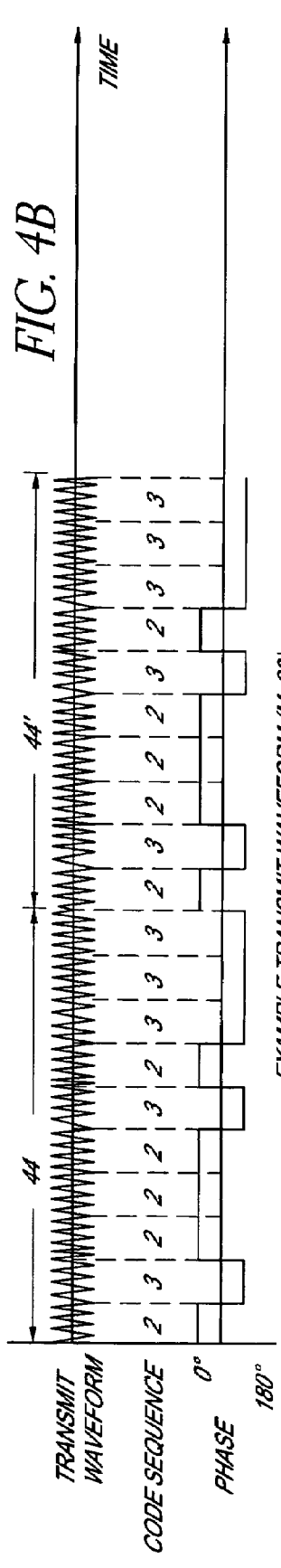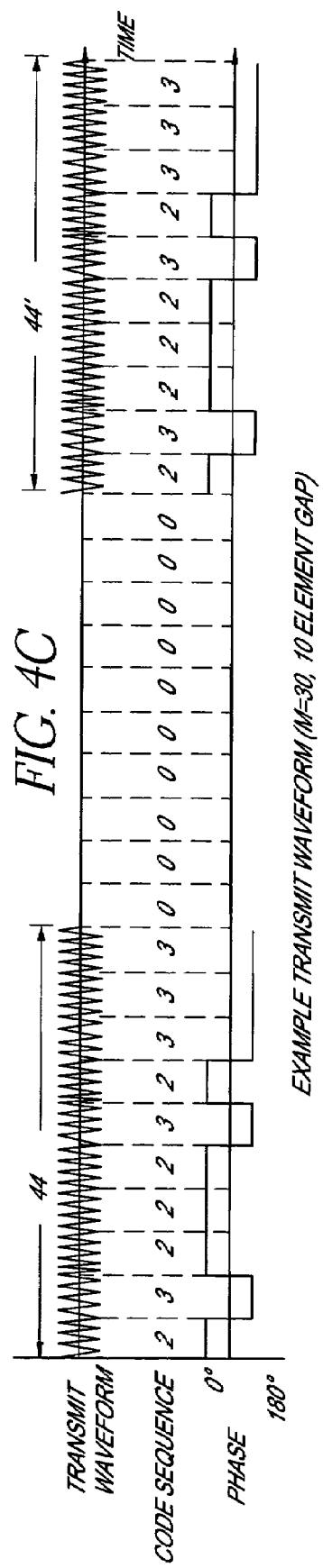

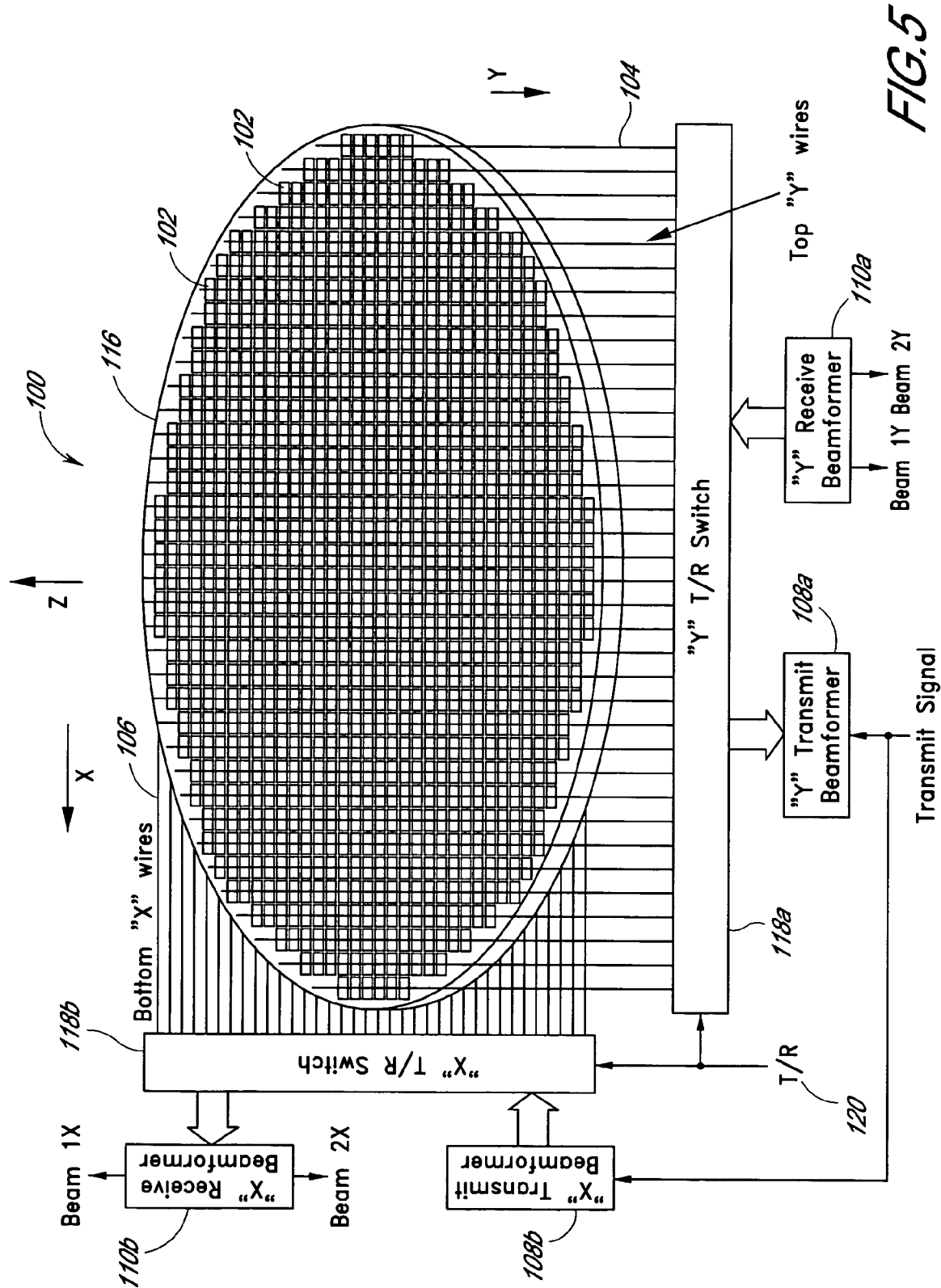

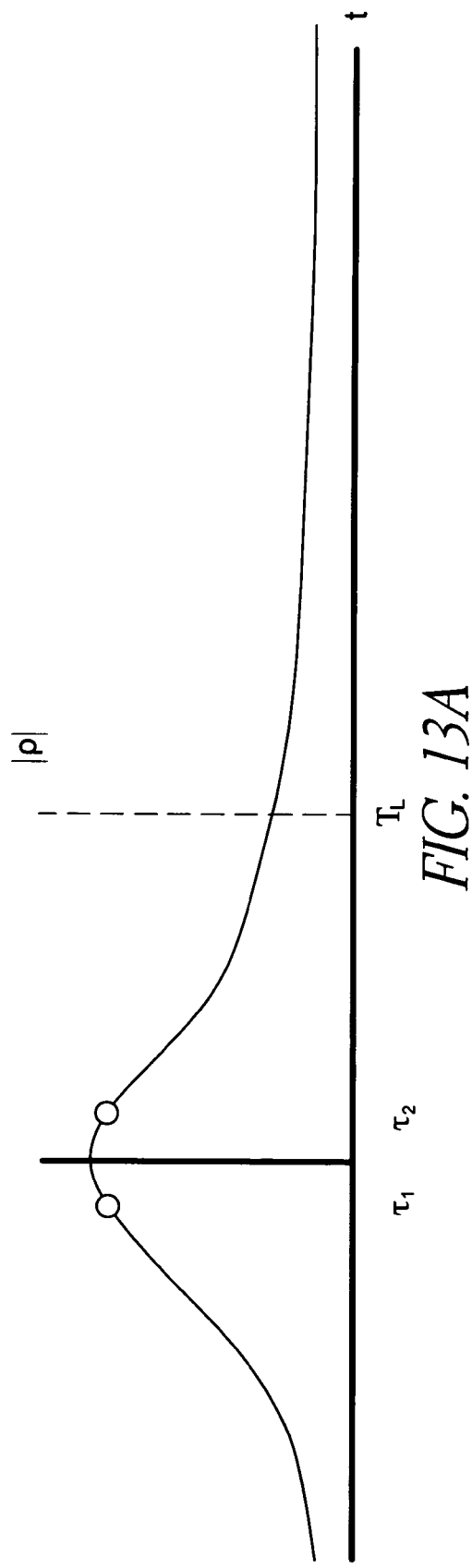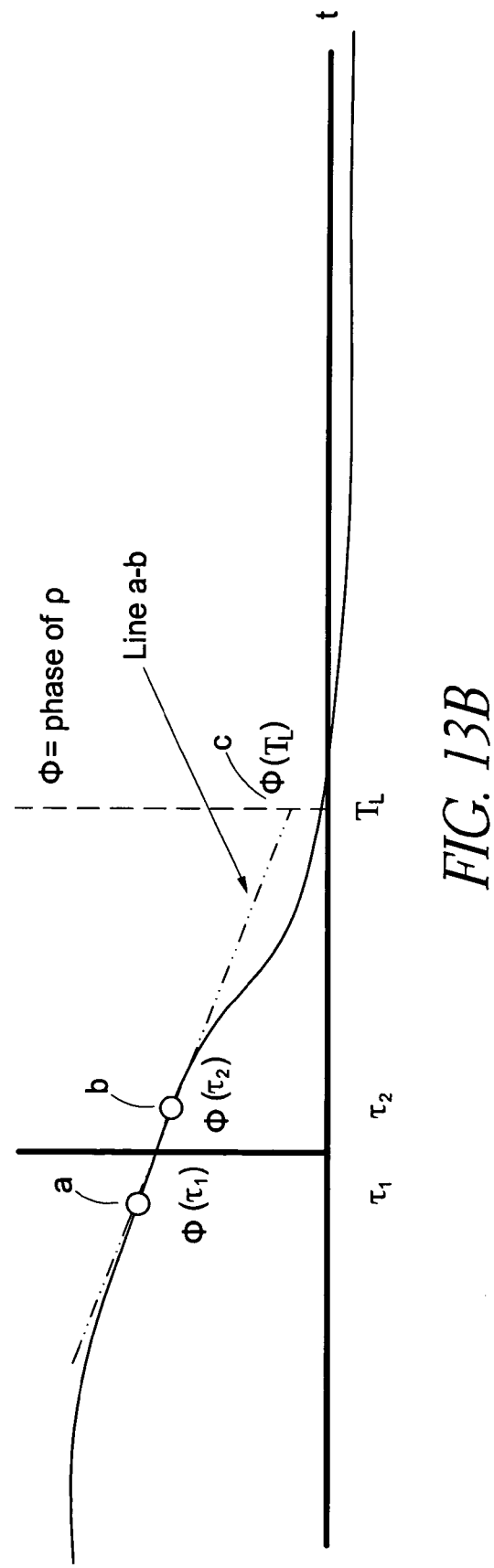

SYSTEM AND METHOD FOR ACOUSTIC DOPPLER VELOCITY PROCESSING WITH A PHASED ARRAY TRANSDUCER INCLUDING APPLYING CORRECTION FACTORS TO VELOCITIES ORTHOGONAL TO THE TRANSDUCER FACE

BACKGROUND OF THE INVENTION

1. Field of the Invention

The present invention relates to velocity measurement systems, and more particularly, to acoustic Doppler current profilers, other underwater instrumentation such as Doppler logs, and radar applications.

2. Description of the Related Technology

A current profiler is a type of sonar system that is used to remotely measure water velocity over varying ranges. Current profilers are used in freshwater environments such as rivers, lakes and estuaries, as well as in saltwater environments such as the ocean, for studying the effects of current velocities. The measurement of accurate current velocities is important in such diverse fields as weather prediction, biological studies of nutrients, environmental studies of sewage dispersion, and commercial exploration for natural resources, including oil.

Typically, current profilers are used to measure current velocities in a vertical column of water for each depth "cell" of water up to a maximum range, thus producing a "profile" of water velocities. The general profiler system includes a transducer to generate pulses of sound (which when downconverted to human hearing frequencies sound like "pings") that backscatter as echoes from plankton, small particles, and small-scale inhomogeneities in the water. Similarly, bottom tracking Doppler velocity logs receive backscattered echoes from the bottom surface. The received sound has a Doppler frequency shift proportionate to the relative velocity between the scatters and the transducer.

The physics for determining a single velocity vector component Vx from such a Doppler frequency shift may be concisely stated by the following equation:

$$Vx = \frac{cf_D}{2f_T\cos\theta} \quad \text{Equation 1}$$

In Equation 1, c is the velocity of sound in water, about 1500 meters/second. Thus, by knowing the transmitted sound frequency, $f_T$, and declination angle of the transmitter transducer, $\theta$, and measuring the received frequency from a single, narrowband pulse, the Doppler frequency shift, $f_D$, determines one velocity vector component. Relative velocity of the measured horizontal "slice" or depth cell, is determined by subtracting out a measurement of vessel earth reference velocity, Ve. Earth reference velocity can be measured by pinging the ocean bottom whenever it comes within sonar range or by a navigation system such as LORAN or GPS. FIGS. 1a and 1b show example current profiles where North and East current velocities (Vx, Vy) are shown as a function of depth cells.

In some configurations, current profilers are configured as an assembly of four diverging transducers, spaced at 90° azimuth intervals from one another around the electronics housing. This transducer arrangement is known in the technology as the Janus configuration. A three beam system permits measurements of three velocity components, Vx, Vy, and Vz (identified respectively as u, v, w in oceanographic literature) under the assumption that currents are uniform in the plane perpendicular to the transducers mutual axis. However, four beams are often used for redundancy and reliability. The current profiler system may be attached to the hull of a vessel, remain on stationary buoys, or be moored to the ocean floor as is a current profiler 10 shown in FIG. 2.

Current profilers are subject to trade-offs among a variety of factors, including maximum profiling range and temporal, spatial (the size of the depth cell), and velocity resolution. Temporal resolution refers to the time required to achieve a velocity estimate with the required degree of accuracy. In typical applications, a current profiler will make a series of measurements which are then averaged together to produce a single velocity estimate with an acceptable level of velocity variance, or squared error. In some applications, bias is more of a concern than the variance in observations. Bias is the difference between measured velocity and actual velocity. It is caused, for example, by asymmetries in bandlimited system components. Measurement bias remains even after long-term averaging has reduced variance to a predetermined acceptable limit. For instance, bias dominance is typically found in measuring large-scale features such as those found at temperature and salinity interfaces.

There are many other velocity measurement systems in addition to the current profilers. Some examples are radar systems, air current measurement systems, and other underwater instrumentation such as Doppler logs which measures the velocity of a vehicle or vessel relative to the surface or bottom of a water body. All these velocity measurement systems have a wide range of applications, and it would be beneficial in the art to utilize and/or modify the characteristics of these types of devices so that their features can be exploited in improving existing products and creating new products that have not yet been developed.

SUMMARY OF CERTAIN INVENTIVE ASPECTS

The system, method, and devices of the invention each have several aspects, no single one of which is solely responsible for its desirable attributes. Without limiting the scope of this invention, its more prominent features will now be briefly discussed.

In one aspect, there is a method of measuring velocity in a fluid medium utilizing a phased array transducer. The phased array transducer comprises a plurality of transducer elements arranged to form a single two-dimensional array. The method comprises receiving echoes of a plurality of beams generated by the transducer, calculating raw velocity estimates based at least in part on the echoes, and removing substantially a bias related to a first velocity from the raw velocity estimates. The first velocity is orthogonal to the face of the two-dimensional array.

In another aspect, there is a system configured to measure velocity. The system comprises a phased array transducer comprising a plurality of transducer elements arranged to form a single two-dimensional array, wherein the transducer is configured to generate a plurality of beams and to receive echoes of the beams. The system further comprises a processing module configured to calculate raw velocity estimates based at least in part on the echoes and to remove substantially a bias related to a first velocity from the raw velocity estimates. The first velocity is orthogonal to the face of the two-dimensional array.

In another aspect, there is a system configured to measure velocity. The system comprises means for generating a plurality of beams and receive echoes of the beams, wherein the means comprises a phased array transducer, the phased array transducer comprising a plurality of transducer elements arranged to form a single two-dimensional array. The system further comprises means for calculating raw velocity estimates based at least in part on the echoes and means for removing substantially a bias related to a first velocity from the raw velocity estimates. The first velocity is orthogonal to the face of the two-dimensional array.

BRIEF DESCRIPTION OF THE DRAWINGS

FIGS. 4a, 4b, 4c are sets of coded-pulse diagrams illustrating exemplary transmission codes of the broadband Doppler system and coded-pulse Doppler system;

FIG. 5 is a block diagram illustrating one embodiment of a two-dimensional transducer array which is a part of one embodiment of the current profiler 10 of FIG. 2;

FIGS. 13a and 13b illustrate the operation of extrapolating the phase function of the received signals to the nominal lag for each beam.

DETAILED DESCRIPTION OF CERTAIN EMBODIMENTS

Figures 1A, 1B:
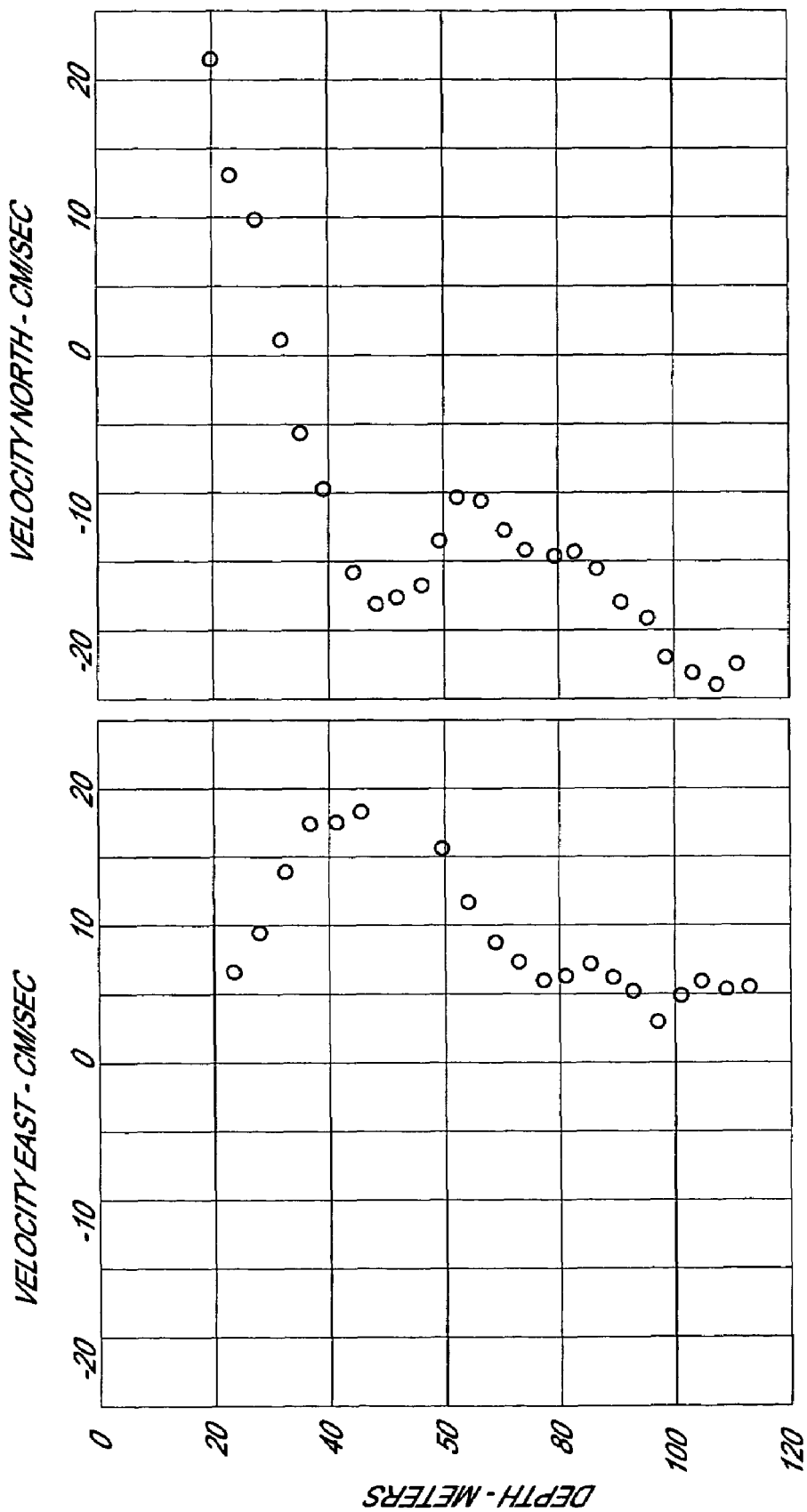
FIG. 1a is a scatter diagram of an exemplary current profile showing the East velocity vector plotted as a function of depth.
FIG. 1b is a scatter diagram of an exemplary current profile showing the North velocity vector plotted as a function of depth.

Various aspects and features of the invention will become more fully apparent from the following description and appended claims taken in conjunction with the foregoing drawings. In the drawings, like reference numerals indicate identical or functionally similar elements. In the following description, specific details are given to provide a thorough understanding of the disclosed methods and apparatus. However, it will be understood by one of ordinary skill in the technology that the disclosed systems and methods may be practiced without these specific details. For example, electrical components may be shown in block diagrams in order not to obscure certain aspects in unnecessary detail. In other instances, such components, other structures and techniques may be shown in detail to further explain certain aspects.

It is also noted that certain aspects may be described as a process, which is depicted as a flowchart, a flow diagram, a structure diagram, or a block diagram. Although a flowchart may describe the operations as a sequential process, many of the operations may be performed in parallel or concurrently and the process may be repeated. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

The description will be given for the case of a current profiler but other velocity measurement systems, such as a Doppler velocity log, share the same general characteristics. Various embodiments of a velocity processing method as described below may be applied to both the current profiler and other velocity measurement applications.

Current Profiling

FIG. 1a is a scatter diagram of an exemplary current profile showing the East velocity vector plotted as a function of depth. FIG. 1b is a scatter diagram of an exemplary current profile showing the North velocity vector plotted as a function of depth. The exemplary current velocity profile depicted in the scatter diagrams of FIGS. 1a and 1b is the type of information that is also the objective of the current profiler.

Figure 2:
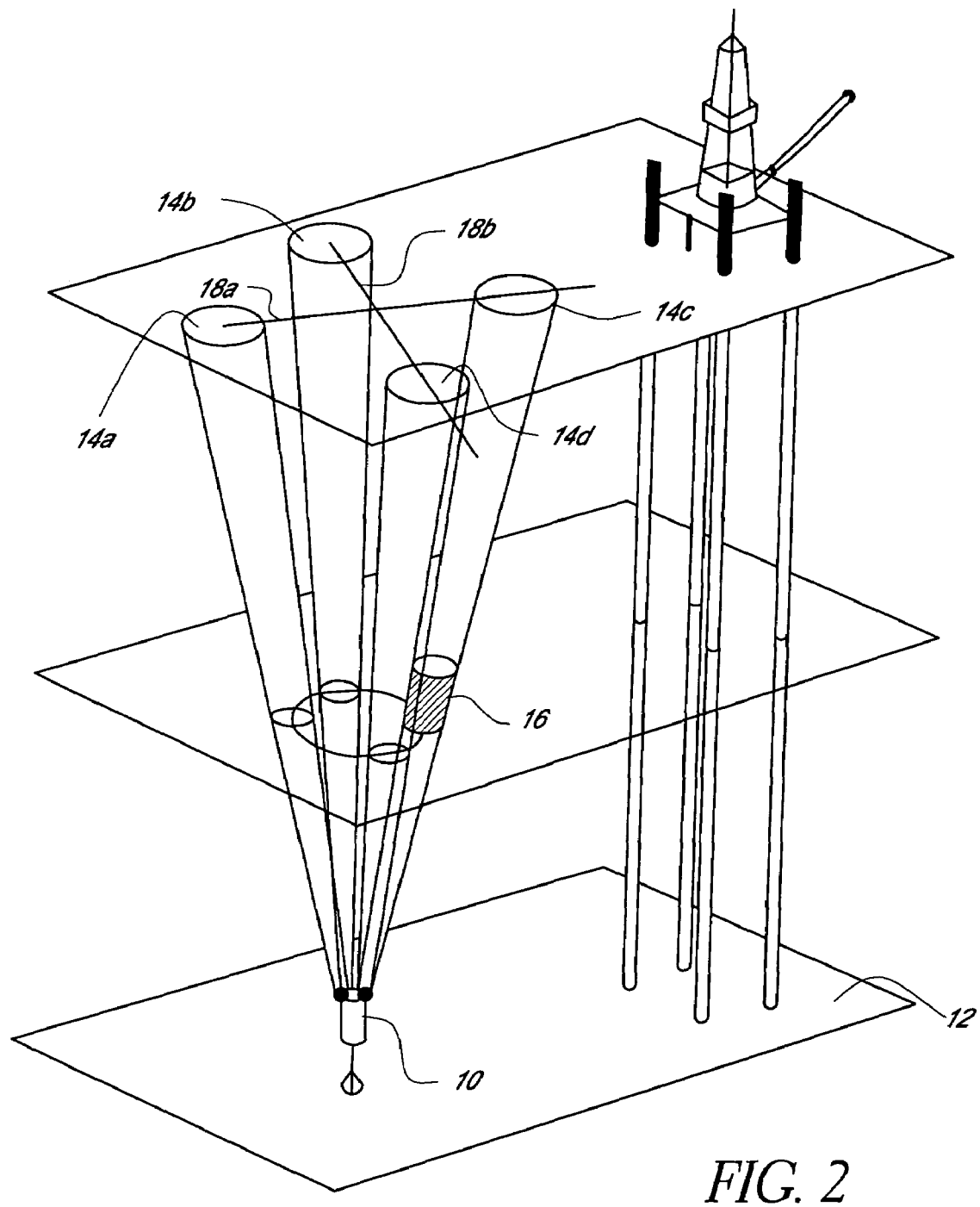
FIG. 2 is a perspective view of one example of a current profiler moored to the ocean floor.

FIG. 2 is a perspective view of one example of a current profiler moored to the ocean floor. The current profiler 10 is semi-permanently moored to the ocean floor 12. In this type of profiler deployment, a record of current profiles is typically stored in a non-volatile memory (not shown) located inside the current profiler 10.

The current profiler 10, as shown in FIG. 2, generates a set of acoustic beams 14a, b, c, d which emanate from transducers. The current profiler 10 is upward looking, that is, the acoustic beams 14 are directed vertically towards the ocean surface. Each beam 14 "illuminates" a water column which can be decomposed into horizontal slices known as range, or depth, cells such as the cell indicated at 16. By appropriate transmission and reception of sound pulses, the phase shift between pulse echoes is calculated. The phase shift is then step-by-step transformed into a Doppler frequency, a velocity along the beam 14, and then one or more orthogonal current velocity components such as those indicated at 18a,b.

The transducers of the current profiler 10 may be implemented in various ways. In one embodiment, the current profiler 10 includes an assembly of four diverging transducers, spaced at 90° azimuth intervals from one another around the electronics housing. This transducer arrangement is known in the technology as the Janus configuration. In some embodiments, the current profiler 10 includes a two-dimensional transducer array which will be described in further detail in FIG. 5. The current profiler 10 may be deployed in other ways than that shown in FIG. 2 including, for example, various combinations of downward, upward or other angled looking, on fixed or moving platforms, or on surface, bottom, or mid-depth moorings.

Various Doppler Measurement Techniques

Figure 3:
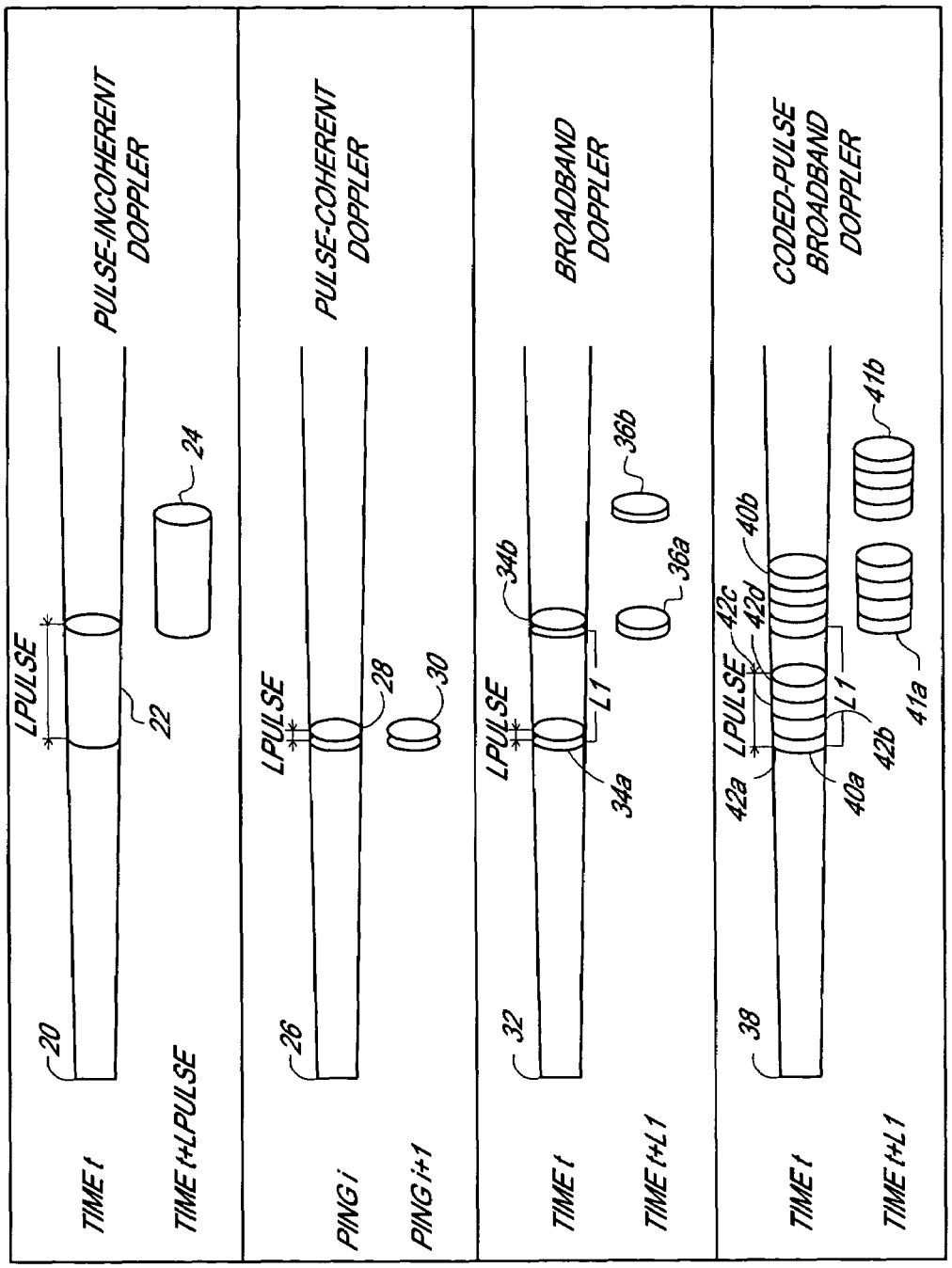
FIG. 3 is a pulse diagram illustrating pulses transmitted by different embodiments of a current profiler including a pulse-incoherent Doppler system, a pulse-coherent Doppler system, a broadband Doppler system and a coded-pulse Doppler system.

FIG. 3 is a pulse diagram illustrating pulses transmitted by different embodiments of a current profiler including a pulse-incoherent Doppler system, a pulse-coherent Doppler system, a broadband Doppler system and a coded-pulse Doppler system. FIG. 3 presents in schematic form a number of different Doppler measurement techniques used in acoustic Doppler current profilers (ADCPs).

In the first technique, a pulse-incoherent ADCP transducer 20 is shown generating a pulse 22 at a time t. The single transmitted pulse 22 is sized to match the associated depth cell. After passing through a depth cell, the pulse 22 is shown at a time t plus a time equal to the length of the pulse (Lpulse), having moved to a new location as indicated at 24.

The pulse 22 may generate an echo (not shown) at each depth cell depending upon the density of scatterers at each depth. Measurement of current velocity at the desired depth cell is based upon a predetermined lag time between transmission of the pulse and reception of the desired echo. A pulse-incoherent ADCP measures current velocity by measuring the Doppler shift in the frequency of the returning echo. Echoes from each pulse are used independently. The Doppler frequency is indirectly calculated from the difference in phase between two different samples of the received signal. The term "incoherent" refers to the fact that coherence need not be maintained between pulses.

In FIG. 3, a pulse-coherent ADCP transducer 26 is shown emitting a pulse 28. The pulse 28 is a shorter duration (greater depth resolution) than the pulse 22 of the pulse-incoherent system. Like the pulse-incoherent Doppler system, the echo from each single pulse is allowed to return to the transducer 26 before the next pulse 30 is transmitted. However, unlike a pulse-incoherent system, the fundamental measurement of a pulse-coherent system is the phase change between two successive echoes at the same depth. The term "coherent" refers to the fact that coherence needs to be maintained between pulses. In some embodiments, a pulse-coherent ADCP transmits a series of short pulses, in which phase coherence is maintained over the transmitted sequence.

FIG. 3 also illustrates pulses that are generated by a broadband ADCP transducer 32. The broadband method differs from either the pulse-incoherent or pulse-coherent methods in that the broadband method utilizes two (or more) pulses in the beam (or the equivalent thereof) at the same time such as the pulses indicated at 34a and 34b. In FIG. 3, the pulses are separated by a lag time, L1, equal to the pulse separation. After traveling some distance and echoing back to the transducer 32, the phase change between the pulse echoes at the same range is measured using an autocorrelation function.

Unlike the pulse-coherent method, the maximum profiling range of the broadband current profiler is not limited to the pulse repetition interval. The pulse length, or width, is typically much shorter than the depth cell size which results in a large time-bandwidth product (hence the term "broadband"). The time-bandwidth product is a product of the averaging time and pulse bandwidth.

FIG. 3 further illustrates pulses generated by a coded-pulse broadband ADCP. A transducer 38 generates a pulse 40a, b that propagates through the water as shown, for example, by the later pulses 41a, b. Each pulse 40 includes four equal-sized code elements 42a,b,c,d that each include one or more cycles (or portions thereof) of the transmitted acoustic waveform. The code elements 42 represent phase coding such that each element is either at 0 or 180 degrees of phase. While only two coded-pulses are shown in FIG. 3, the method can be generalized to include more than two pulses.

For a coded-pulse ADCP, measurement of phase change is identical to that of the broadband method previously discussed. In addition, however, the pseudo-random phase coding is applied to the pulses allowing longer pulses to be used without decreasing the bandwidth. Longer pulses increase the echo power thus delaying the signal decorrelation to greater ranges and extending the useful profiling range of the system. The coded pulses may be as large as the size of the depth cell. If the pulse separation or lag time L1 is equal to the pulse length, the pulses are combined into a single, continuous-coded transmission.

FIG. 4 shows three examples of "ideal" coded pulses having different lengths that may be generated by the coded-pulse broadband ADCP. Each diagram (FIGS. 4a,b,c) corresponds to one pulse, or ping. The actual waveforms that are injected in the water are somewhat different than those portrayed in FIG. 4 due to the finite bandwidth of the transducers and the power amplifier. Therefore, in the corresponding actual waveforms there is a short recovery time after phase reversals.

FIG. 4a includes three different representations of a sequence of code elements generally indicated at 44a-j. The first code representation is a transmit waveform generally indicated at 46. Each code element 44 is a collection of four cycles of the carrier signal. Phase shifts of 180 degrees may occur between code elements 44 as, for example, shown by the transition between the code elements 44a and 44b. The exemplary pulse of FIG. 4a has M=10 code elements 44 wherein the first five code elements 44a-e are inverted and repeated by the last five code elements 44f-j so as to essentially combine two pulses in the continuous waveform 46. Inverting a second pulse, such as code elements 44f-j, may be useful in reducing noise bias.

Thus, for the waveform 46, an autocorrelation function (as is further discussed below) is performed on the first five elements 44a-e and the last five elements 44f-j after inversion using a lag time equal to the time to transmit five code elements. In certain cases, the number of code elements for a particular application will be matched to the size of the depth cell.

The pulse coding can also be represented in binary form as shown by a code sequence generally indicated at 47 in FIG. 4a. The code sequence 47 is based on each code element 44 being defined by two bits. The most significant bit ($B_1$) indicates whether the transmitter is on (1) or off (0) for the duration of the code element 44. The least significant bit ($B_0$) indicates the phase of the code element 44, with "0" indicating 0° degree and "1" indicating 180°. When $B_1$ is of a value "0", it does not matter what value $B_0$ is of.

The code sequence 47 shows the decimal equivalent of the binary code. The code element 44a, for example, is defined in the code sequence 47 as "2" meaning that the transmitter is on and the code element 44a is 0 degrees phase. A phase waveform 48 presents the same fundamental information as the transmit waveform 46 and code sequence 47 but it is expressed in the form of a square-wave.

FIG. 4b shows a coded-pulse that differs from that of FIG. 4a in that the pulse is twice as long (M=20). The first ten code elements 44 of the pulse in FIG. 4b are the same as the code elements 44 of FIG. 4a. The last ten code elements 44' are simply a repetition of the first ten. Thus, the two pulses 44, 44' are combined in a single transmit waveform having a lag time equal to the time to transmit ten code elements.

FIG. 4c shows a coded-pulse that differs from that of FIG. 4b in that the pulse is longer (M=30) due to a ten code element dead-time placed between the two sets of ten transmitted code elements 44, 44'. Thus, the lag time is equal to twenty code elements. The short term error (i.e. variance) in the Doppler frequency is inversely proportional to the pulse separation. The range resolution is determined by the length of the coded pulse.

In some embodiments, the code is carefully chosen so as to eliminate bias from central peak and sidelobe noise in the autocorrelation function. Central peak noise is effectively eliminated by inverting the second pulse, e.g., as shown in FIG. 4a, in half of the transmitted pings. The following steps are taken to eliminate sidelobe noise: (1) a code is used that has zero autocorrelation at one lag time to each side of the sidepeak (where phase measurements are made), (2) a code is used that has minimal sidelobes near the sidepeak, which are arranged symmetrically around the sidepeak, and (3) pairs of complementary, or Golay, codes are used on successive pings so that biases will cancel with averaging.

The pulse separation, or lag time L1, determines accuracy of range-velocity resolution with shorter lag time meaning greater resolution. It is even possible to make the lag time less than the length of a single coded pulse by transmitting pulses that overlap in one or more code elements. For example, using letters of the alphabet to represent code elements, the sequence "ABABA" would allow two pulses "ABA" having a length of three code elements to be transmitted with a lag time equal to the time to transmit two code elements.

A skilled technologist will thus understand and appreciate that there are trade-offs in choosing the proper code, code length and pulse separation of a multi-pulse waveform that will depend on the particular application of the present invention. Hereinafter, both the broadband ADCP and coded-pulse broadband ADCP systems and methods will generally be referred to as the broadband ADCP unless otherwise indicated.

Structure and Operation of a Phased Array Transducer

FIG. 5 is a block diagram illustrating one embodiment of a two-dimensional transducer array which is a part of one embodiment of the current profiler of FIG. 2. A typical planar acoustic transducer array configuration 100 is depicted. Individual array elements 102 are electrically interconnected along front-side columns 104 and back-side rows 106. Array elements 102 are interconnected to the associated beamformer 108, 110 through 2-axis transmit/receive (T/R) switches 118. The transmit 108 and receive 110 beamformers may be either phase or time-delay beam forming networks. In the exemplary embodiment, the beamformers are phase beam forming networks.

The coordinate system used for the purposes of this description is as shown with the rows 106 oriented in the X axis, columns 104 in the Y axis, and the Z axis normal to the plane face 116.

The array face 116 is circular, but other form factors such as ellipses or polygons which are generally symmetrical in the two face dimensions are also suitable for forming narrow inclined beams of general conical form. The array is composed of a large number of small elements 102 which have symmetrical faces, typically square, circular, or rectangular in form (i.e., their facial crossection). In one embodiment, the face width of each element is approximately $0.5\lambda$, where $\lambda$ is the acoustic wavelength in water of the desired center frequency. To form beams with 4° beam width, an array diameter of approximately $16\lambda$ is required, consisting of a 32×32 element array of approximately 800 elements. The back side rows 106 (X direction) and front side columns 104 (Y direction) of the array elements are electrically connected together along parallel lines of elements with thin acoustically transparent material, as shown in FIG. 5. The rows and columns are normally, but not necessarily, orthogonal to each other.

Each of the array X axis rows 106 and Y axis columns 104 are connected to a T/R switch 118 which electrically connects the sets of X and Y lines to respective X and Y receive beamformers 110 in the receive mode, and to X and Y transmit beamformers 108 in the transmit mode. In some embodiments, the T/R switch 118 is controlled by a T/R logic signal 120 to switch between transmit and receive mode. In other embodiments, the T/R switch may include a passive component that operates by detecting whether a transmit signal is applied by the transmit beam formers 108. The T/R switch switches to transmit mode if a transmit signal is detected, and to receive mode if a transmit signal is not detected.

When in the transmit mode, the array lines are connected through the T/R switch 118 to the transmit beamformers 108 which provide the electrical transmit drive signals from a low impedance electrical source (relative to the electrical impedance of the line of transducer elements). When in the receive mode, the array lines are connected through the T/R switch to receive beamformers 110 which receive the electrical signals from the transducer lines.

This low electrical source/load impedance on each X and Y line (low source impedance during transmit) allows simultaneous and independent access to each X row 106 and Y column 104 for application of transmit electrical drive signals to each X row and Y column. Furthermore, parallel sets of X and Y axis line arrays can be simultaneously and independently formed. X-axis transmit and receive line arrays are formed by the parallel electrical connection along the back side rows 106 and the presence of the low impedance signal ground on all of the front side Y-axis columns 104.

During transmit mode, transmit drive signals are applied through the T/R switch to the parallel X-axis back side electrical interconnection lines from a transmit amplifier which has a low output impedance relative to signal ground. While the X-axis drive signals are being applied to individual X-axis line arrays, the entire Y-axis 32 parallel line array face is maintained as a low impedance path to signal ground (via the signal path through the Y-axis T/R switch 118a to the low impedance Y-axis drivers of the Y beamformer 108a) to ensure that the X-axis drive signal is imposed solely across the X-axis rows, and does not couple to the Y-axis side of the array. Similarly, while the Y-axis drive signals are being applied to Y-axis line arrays, the entire X-axis array face is maintained as a low impedance path to signal ground to allow signals to be independently applied the Y-axis without coupling to the X-axis. Thus, by superposition of both X and Y axis transmit drive signals, the low impedance associated with the transmit beamformer sources permits X- and Y-axis line transmit arrays to be formed simultaneously and independently.

During receive mode, the electrical signal present on each X-axis row 106 represents the sum of the received electrical signals of all elements in each row. When receiving signals from a column, the column signal is independent of the row signals being simultaneously received. Similarly, when receiving signals from a row, this row signal is independent of the column signals being simultaneously received.

This independent and simultaneous X row and Y column electrical access during both transmit and receive modes via the X and Y signal lines allows the array to be used as a 2-dimensional array to simultaneously and independently form multiple inclined acoustic beam set in both the X-Z and Y-Z planes. The beamforming operation in each plane is the same as conventional 1-dimensional phased and/or time-delay arrays. Thus, the 2-dimensional beamforming operation is in general the equivalent of two overlaid 1-dimensional arrays, with one array rotated 90°.

During transmit mode operation, phase or time-delayed signals applied to the X rows form inclined acoustic transmit beams in the Y direction (Y-Z plane). Simultaneously and independently, phase or time-delayed signals applied to the Y columns to produce inclined acoustic transmit beams in the X direction (X-Z plane). During receive mode operation electrical signals received on the X rows are phase or time delayed and combined in the X row receiver beamformer to produce inclined receive acoustic beams in the Y direction. Simultaneously and independently, signals received on the Y columns and combined in the Y side beamformer produce inclined receive acoustic beams in the X direction. Thus, through superposition of the X and Y axis electrical and acoustic signals, 2-dimensional acoustic beam formation from a single planar array in both transmit and receive modes is achieved.

Figure 6A:
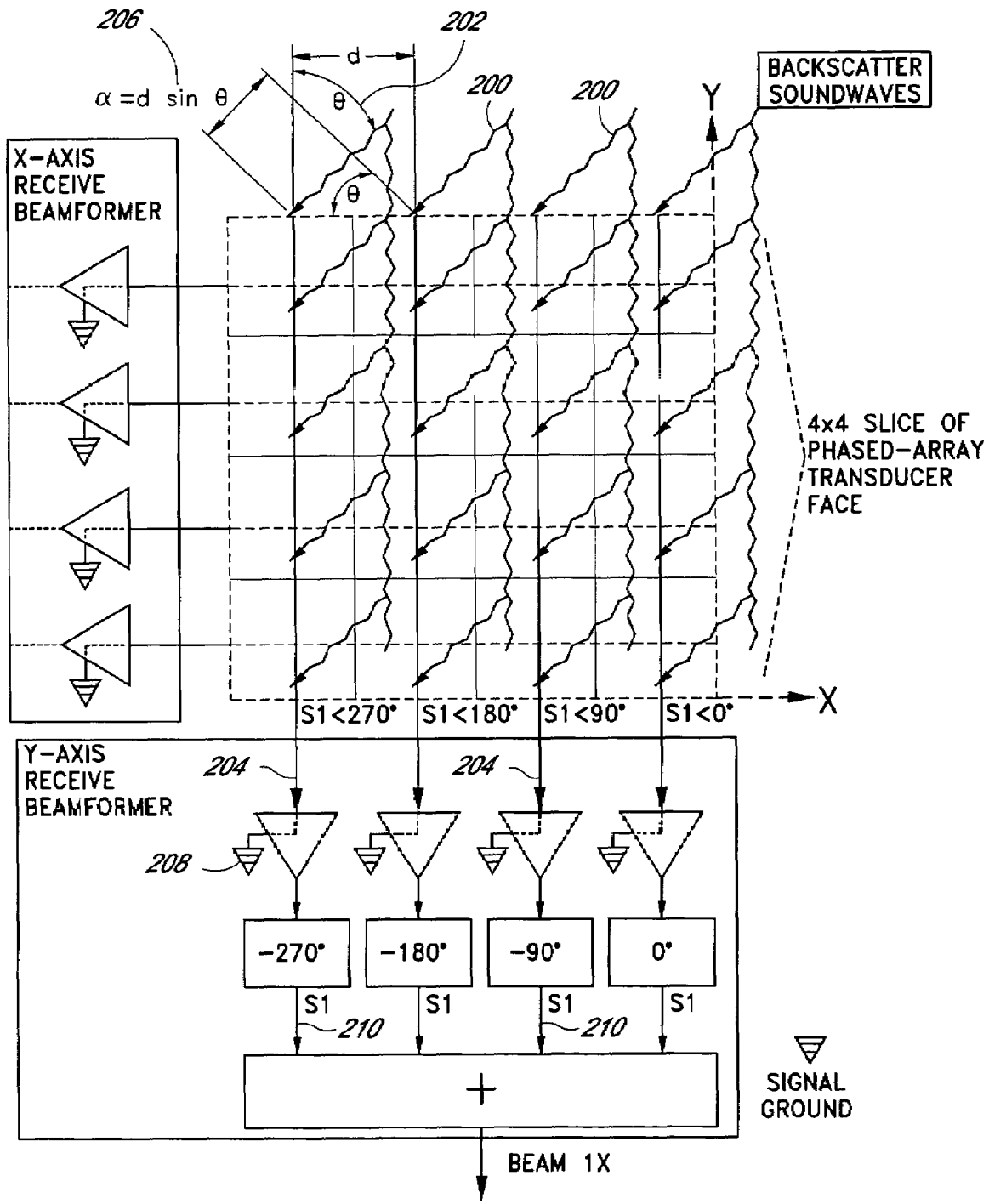
FIGS. 6a and 6b illustrate the operation of the previously described two-dimensional array of FIG. 5 with a phase-shift beamformer.
Figure 6B:
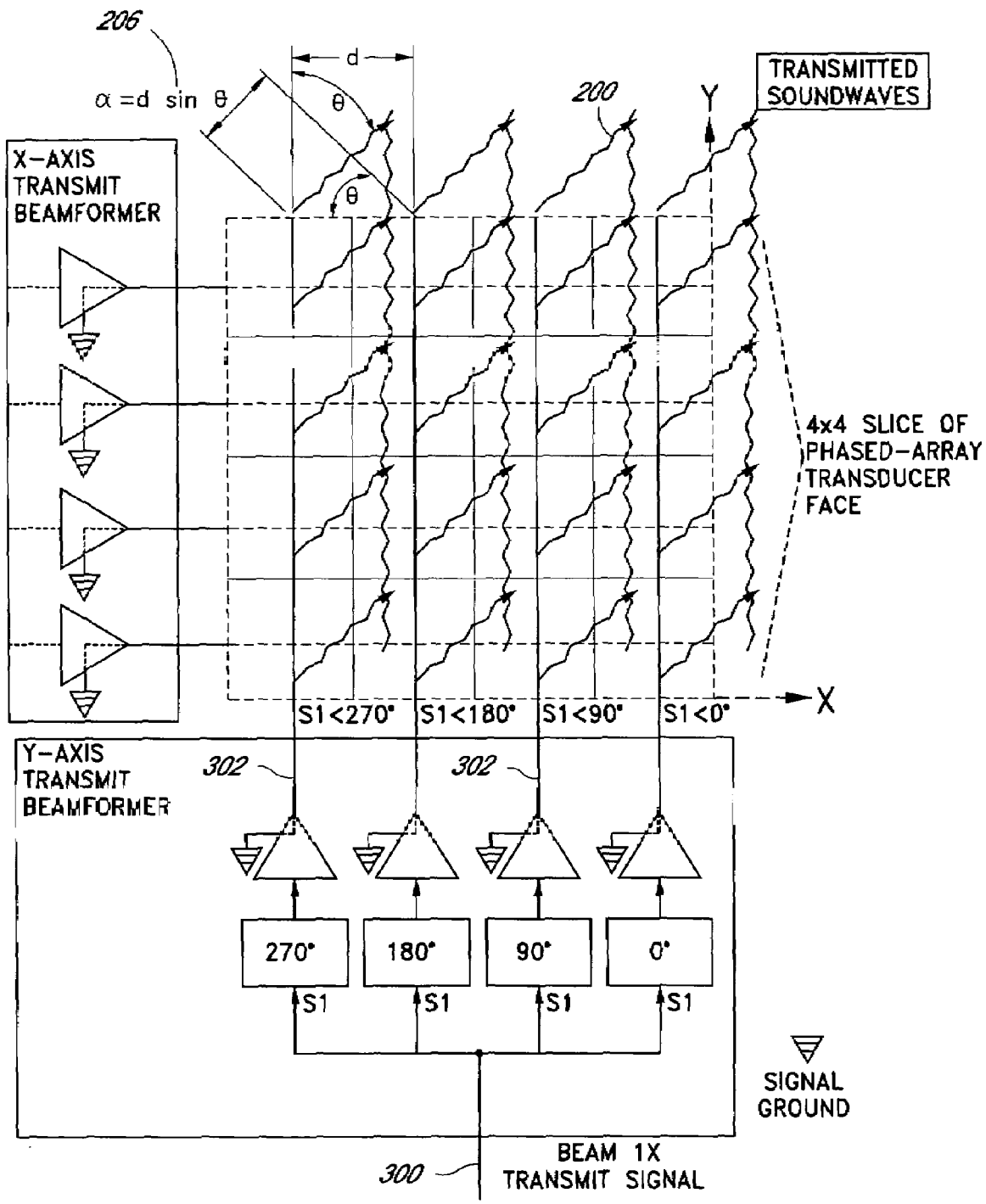

FIGS. 6a and 6b illustrate the operation of the previously described two-dimensional array of FIG. 5 with a phase-shift beamformer. To understand the fundamental principles of operation how these two-dimensional transmit and receive acoustic beams are formed, the operation of sixteen element array subset of the 32×32 element two-dimensional array transducer is considered.

During receipt of a long tone burst acoustic signal at a single frequency (narrowband), f, with wavelength, $\lambda=c/f$, where c is the sound propagation velocity in the fluid media, incoming sound ray wavefronts 200 traveling in the −X direction and at an angle $\theta$ 202 with the Z axis (Z being normal to the array plane, or normal to the plane of the Figure) travel different distances to each of the Y-axis (frontside) column line-arrays 204, and thus strike each of the line arrays at different times, and in general, with different phases. As illustrated in FIG. 6a, the path length differences between adjacent line-arrays ($\alpha$) 206 is related to the element center-to-center separation distance (d) by $$\alpha = d \sin \theta. \quad \text{Equation 2}$$

The wavefront arrival time differences ($\tau$) between adjacent line-arrays is $$\tau = \alpha/c = (d/c)\sin \theta \quad \text{Equation 3}$$

If the elements are spaced at distances corresponding to, for example, a half-wavelength of the arriving narrowband signal ($d=\lambda/2$), the path length difference expressed in terms of arriving signal wavelengths is given by $$\alpha = (\lambda/2)\sin \theta. \quad \text{Equation 4}$$

For an arrival angle of, for example, 30°, $$\alpha = (\lambda/2)\sin 30 = \lambda/4. \quad \text{Equation 5}$$

This corresponds to an inter-element angular phase shift of 90° for arriving narrowband signals. Thus, when the narrowband pulse is being received by all Y-axis line-arrays with the backside coupled to the low impedance virtual grounds 208 as described above, the received electrical signal phases along the set of four Y-axis line-arrays will be 0, 90, 180, and 270 degrees, respectively.

Receive operation of the frontside (Y) columns with the backside rows 106 all coupled to signal ground in the X-axis receive beamformer 110b will first be considered. Each set of four X-axis electrical signals (in the 4×4 array used for illustration) are connected to virtual ground nodes 208 in the receiver preamplifier of the receive beamformer 110a to form a signal reference for the backside rows, and phase shifted −90° between adjacent line-arrays (0, −90, −180, and −270 degrees), as shown. The imposed phase shifts compensate for those arising from the different inter-element path lengths of the narrowband acoustic pulse incident on the line arrays, as illustrated in FIG. 6a. The resulting four signals 210 will be in phase and, when summed, will form a maximum acoustic interference pattern when receiving a wavefront arriving at a 30° incidence angle. This maximum corresponds to the central axis of one of the main lobes of the formed beams.

A second receive beam can be formed for incoming sound ray wavefronts traveling in the −X direction and at an angle $\theta$ with the Z direction (for example, at a −30° incidence angle) by reversing the sign of the 90° imposed phase shift on the four signals and summing the signals. Since the set of four signal phases repeats for additional sets of four line-arrays, larger arrays can be implemented by summing the signals from all sets of four line-arrays to further enhance the interference patterns at ±30°. When additional sets of four line-array segments are utilized as described, the acoustic signal gain along the ±30° directions is increased, or correspondingly, the beamwidth in that direction is reduced, as additional sets of arrays are added.

Another beamforming method is to first sum all of the equal phase signals from different array sets, then apply the imposed 90° phase shifts between the summed set of four signals. This can be accomplished by simply electrically connecting each fourth line-array in parallel. The effective beamwidth in the X direction is determined by the number of line-array sets in the array. In the Y direction, the beamwidth is determined by the beam patterns of the line-arrays, which is inversely proportional to the length (in acoustic wavelengths) of the array lines. In some embodiments, narrow inclined acoustic beams with similar widths in both planes are desired and the X and Y plane dimensions are maintained about the same.

During the transmit mode, operation of the 2-axis array is similar to the above described receive mode except the flow of signals is reversed, as illustrated in FIG. 6b. Transmit operation of the frontside columns with the backside rows all coupled to signal ground will first be considered. A long tone burst carrier frequency 300 is applied to a phase shift transmit beamformer 108a, generating four drive signals with relative phases of 0, 90, 180 and 270 degrees. These are applied to the four parallel wired sets 302 of Y columns from low impedance drivers. The imposed phase shifts will compensate for those arising from the different path lengths between line arrays, and a transmitted acoustic signal interference pattern at a −30° incidence angle will be formed, corresponding to the center of one of the main beam lobes. Another transmitted beam can be formed at a −30° incidence angle by reversing the sign of the 90° imposed phase shift as previously described.

Receive and transmit operation in the Y-axis is the same. When considering signals applied and received from the backside rows, the frontside columns are coupled through a low impedance to signal ground. The presence of the low transmit drive load impedance to ground on each side results in fully independent X and Y axis operation. From superposition of the X and Y axis signals, it can also be seen that both axes (i.e., rows and columns) can be in operation simultaneously.

Figure 7:
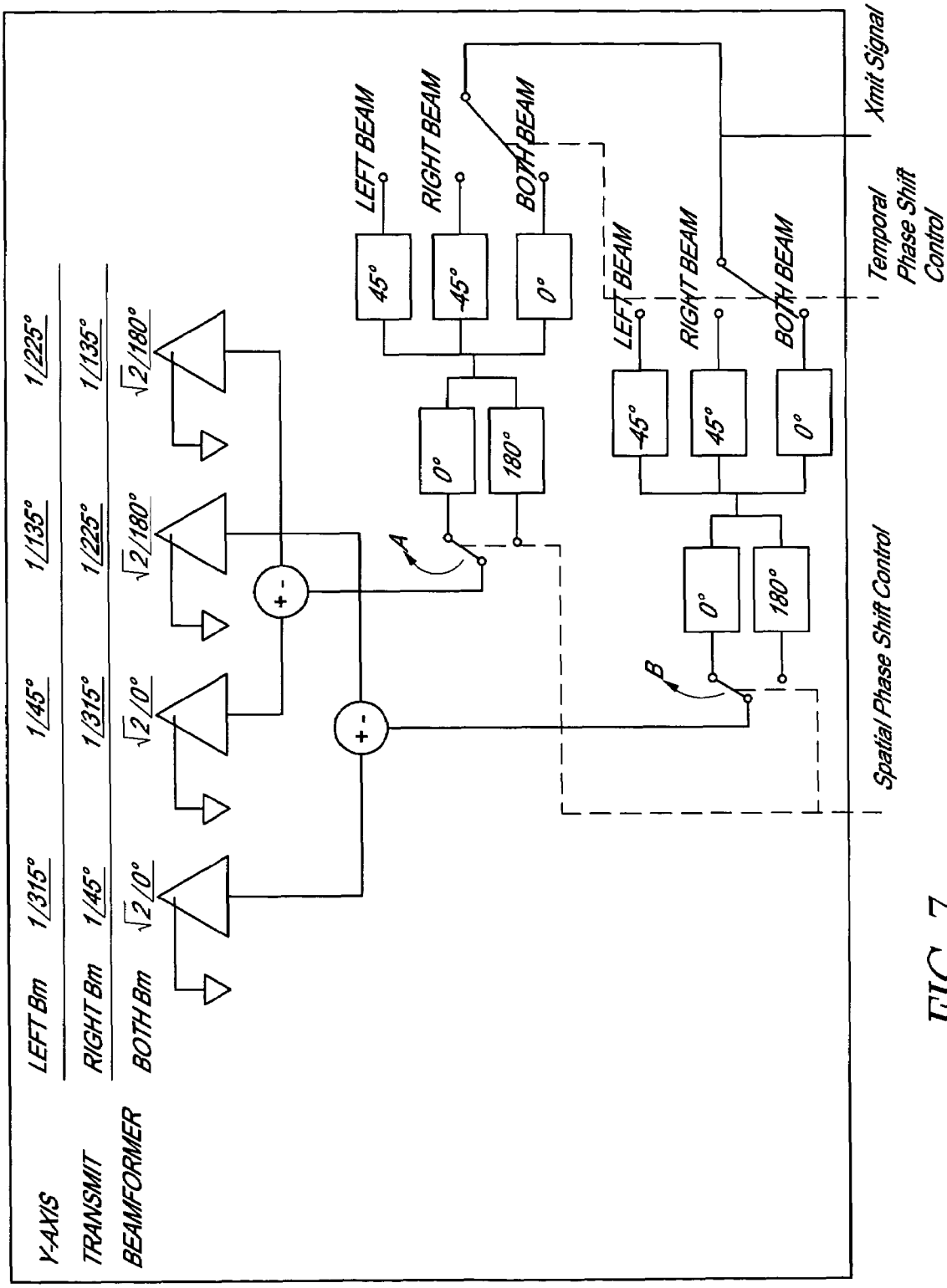
FIG. 7 shows a detailed view of the "Y axis Transmit Beamformer" of FIG. 6b illustrating how the beamformer transmits two beams simultaneously.

FIG. 7 shows a detailed view of the "Y axis Transmit Beamformer" of FIG. 6b illustrating how the beamformer transmits two beams simultaneously. The transmit beamformer of FIG. 7 includes two additional inputs (besides the transmit signal) to the beamformer that control temporal and spatial phase shift respectively. These phase shifts are imposed to the transmit signal to generate four different drive signals as illustrated.

The spatial phase shift control signal controls two switches of the transformer. Each switch may be at one of two settings: 0° or 180°. In the exemplary embodiment, the spatial phase shift control signal is not used and the two switches are at the "0°" setting.

The temporal phase shift control signal is configured to control whether a left beam, a right beam, or both beams are generated on one plane. The left beam refers to a beam traveling in the −X direction and at an angle with the Z direction. The right beam refers to a beam traveling in the X direction and at an angle with the Z direction. Two switches are controlled by the temporal phase shift control signal to switch to one of three settings.

Either a left beam or right beam may be generated by controlling the phase shift of the four drive signals as illustrated in FIG. 6B. By superposition, the beamformer may generate both beams simultaneously by adding together the drive signals needed to create each beam.

The table at the top of the FIG. 7 illustrates the four drive signals to generate a left beam, a right beam, and both beams. Each drive signal is represented by a vector. The vector of each of the four drive signals to generate both left and right beams is the sum of the vectors of the drive signal used to generate each beam. For example, in the first column, the drive signal used to generate the left beam, the right beam, and both beams is a vector of unit amplitude and 315° phase, a vector of unit amplitude and 45° phase, a vector of $\vec{\sqrt{2}}$ amplitude and 0° phase respectively. Similarly, the receive beamformer in FIG. 6a may be adapted so that two beams may be received simultaneously.

Figure 8:
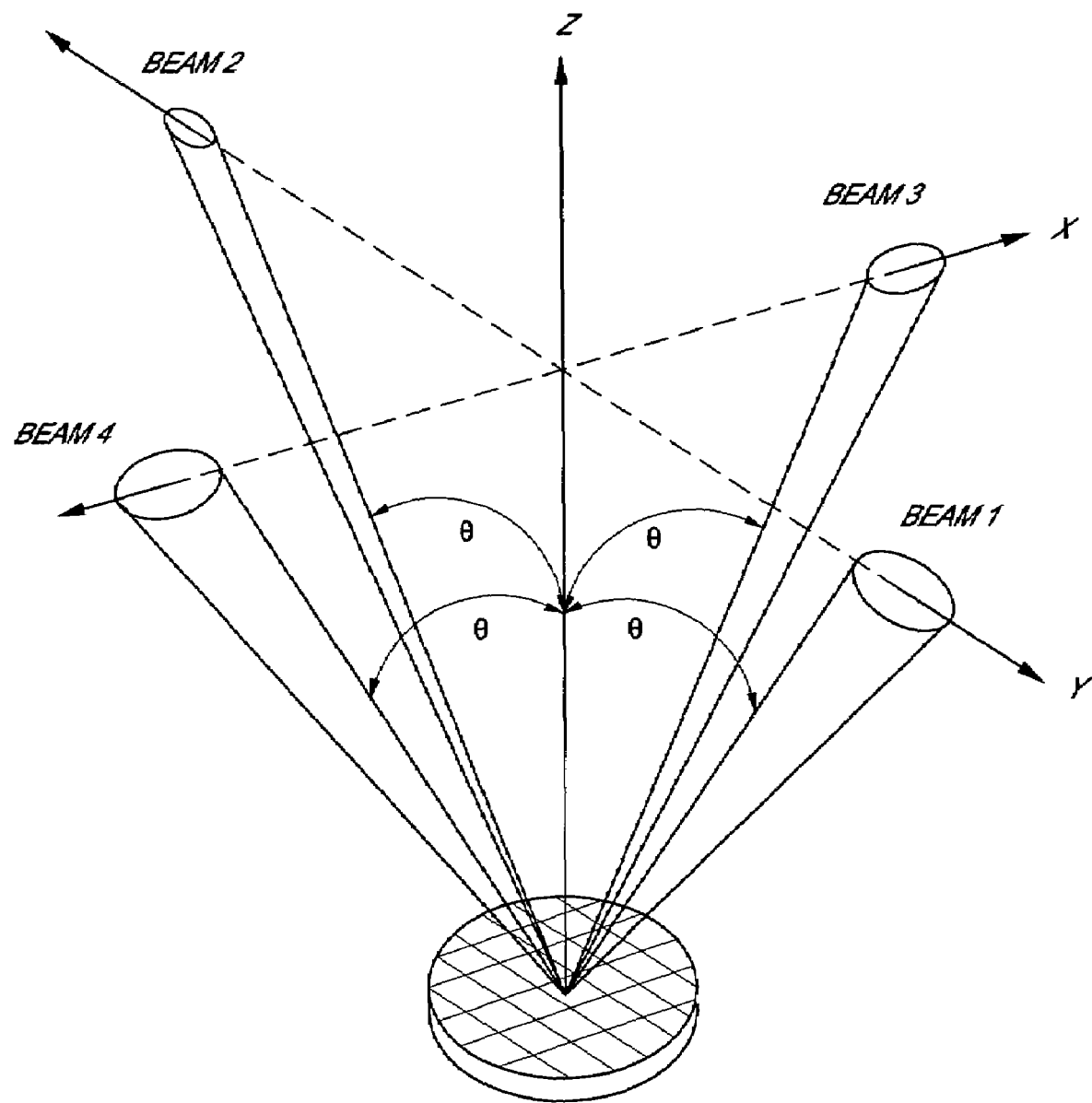
FIG. 8 is a perspective view illustrating an example of a configuration of four acoustic beams inclined relative to the array normal (i.e., Z-axis) and positioned within two planes perpendicular to the array face plane (i.e., X-Y plane) of the transducer array of FIG. 5.

The above described 2-axis beamforming technique using fixed phase delays to form narrow transmit and receive beams is referred to as a "two-dimensional phased array" transducer. It may be used in narrowband applications which transmit a long tone burst of substantially single frequency or a narrow bandwidth. Four inclined narrow beams positioned in the X-Z (beams 3 and 4) and Y-Z planes (beams 1 and 2) and all inclined at an angle relative to the Z direction are formed from a single flat array aperture, as shown in FIG. 8.

In other embodiments, the phased array transducer may be used in broadband applications. From the sound ray diagram in FIG. 6a, it is seen that for a fixed element spacing of d, the angle of each beam is related to the acoustic frequency by $$\theta = \sin^{-1}(\lambda/4d) = \sin^{-1}(c/4fd). \qquad \text{Equation 6}$$

Thus, the beam angle will be frequency dependent and, if the incoming or outgoing wave has a broad spectrum, the mainlobe beam pattern will be correspondingly broadened in angular space. Because of this bandwidth induced beam spreading, the phased array technique may not work as well with broadband ADCPs which transmit signals with a broad spectrum (typically 20-50% of the carrier frequency) as with narrowband application.

As can be appreciated from the previous description, certain inventive aspects may be embodied to produce many combinations of 2-axis inclined beams with different carrier frequency, beam characteristics and signal bandwidth capabilities.

Figure 9:
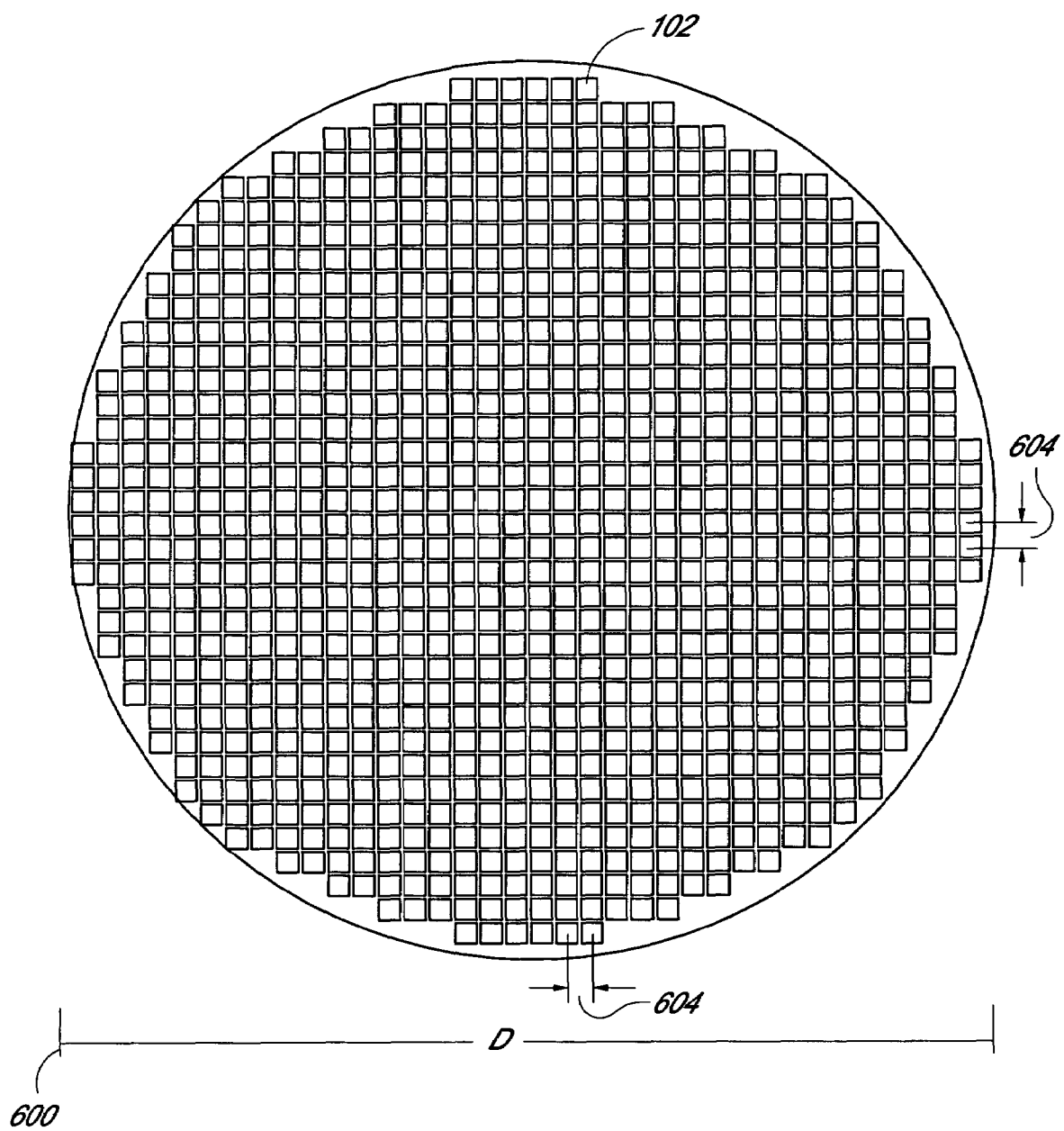
FIG. 9 illustrates a top view of one embodiment of the transducer array of FIG. 5.

FIG. 9 illustrates a top view of one embodiment of the transducer array of FIG. 5. The exemplary embodiment is configured to produce two narrow beamwidth beams at a 150 kHz carrier frequency in each of two axes for use in ADCP applications.

The exemplary embodiment includes a circular transducer array and two substantially identical beamforming networks, each of which provides the drive signals used to form two inclined transmit/receive beams. The diameter D 600 of the array is, for example, approximately 160 mm. There are 800 individual square faced 150 kHz piezo-electrical ceramic elements 102 closely spaced at a center to center distance 604 of 5 mm (about ½ wavelength at 150 kHz, based on a propagation velocity of roughly 1536 m/s). The exemplary embodiment may be modified to meet the specific requirements of an application.

Figure 10:
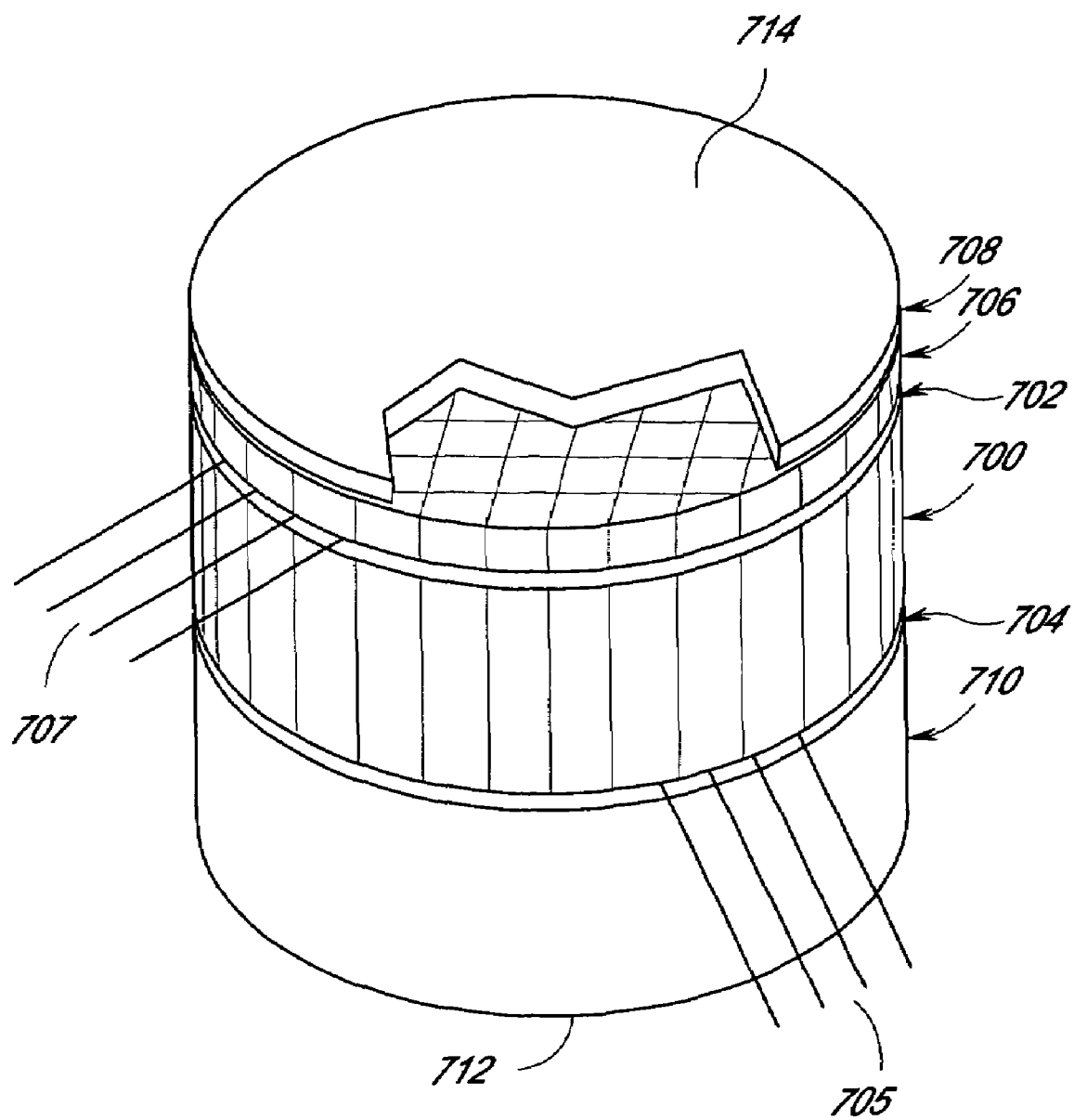
FIG. 10 is a three dimensional view of one embodiment of the transducer array of FIG. 5 illustrating the multilayer construction.

FIG. 10 is a three dimensional view of one embodiment of the transducer array of FIG. 5 illustrating the multilayer construction. This thickness dimension in this view is expanded to show the layered structure. The ceramic array elements 700, e.g., the 800 elements 102 shown in FIG. 9 are electrically and mechanically connected by two pieces of thin, acoustically transparent flexible printed circuits (FPC) 702, 704 on the top and bottom surfaces of the ceramics. Such circuits may be fabricated from Kapton™ (polyimide) or other suitable material. Electrical connection to each ceramic element 700 is achieved by, for example, press fitting and bonding (or alternatively, low temperature soldering) the printed electrical conductor lines to the conductive face of the array elements. Bonding may be accomplished by use of a suitable adhesive or glue, although other forms of bonding may also be suitable. The connection pattern is along element columns on the front side and along rows on the back side, with access to columns on one side (Y wires 705) and rows on another side (X wires 707). A piece of fiberglass material 706, for example, ⅛ inch (3.18 mm) thick, (such as that bearing the tradename "G-10" or other similar material) with face dimensions matching the ceramic is bonded to the front of the top flexible circuit on each 150 kHz transducer array. This fiberglass (G-10 or equivalent) piece is an acoustic quarter wave transformer used to improve the impedance coupling between the array and water, and to significantly increase the transducer element bandwidth. In certain embodiments, the significant increase in the transducer bandwidth is desired for broadband ADCP application. A layer of urethane 708 bonded to the front of the fiberglass piece seals the face to the water in front. A layer of gas filled cardboard 710 is placed between the back plane of the housing 712 and the back of the bottom flexible circuit to reflect the acoustic energy transmitted backward and to provide the necessary mechanical support against the water pressure incident on the front of the transducer array surface 714. It is appreciated that other front and back matching layers may be used depending on the particular application.

An Exemplary ADCP Using a Phased Array Transducer

Figure 11:
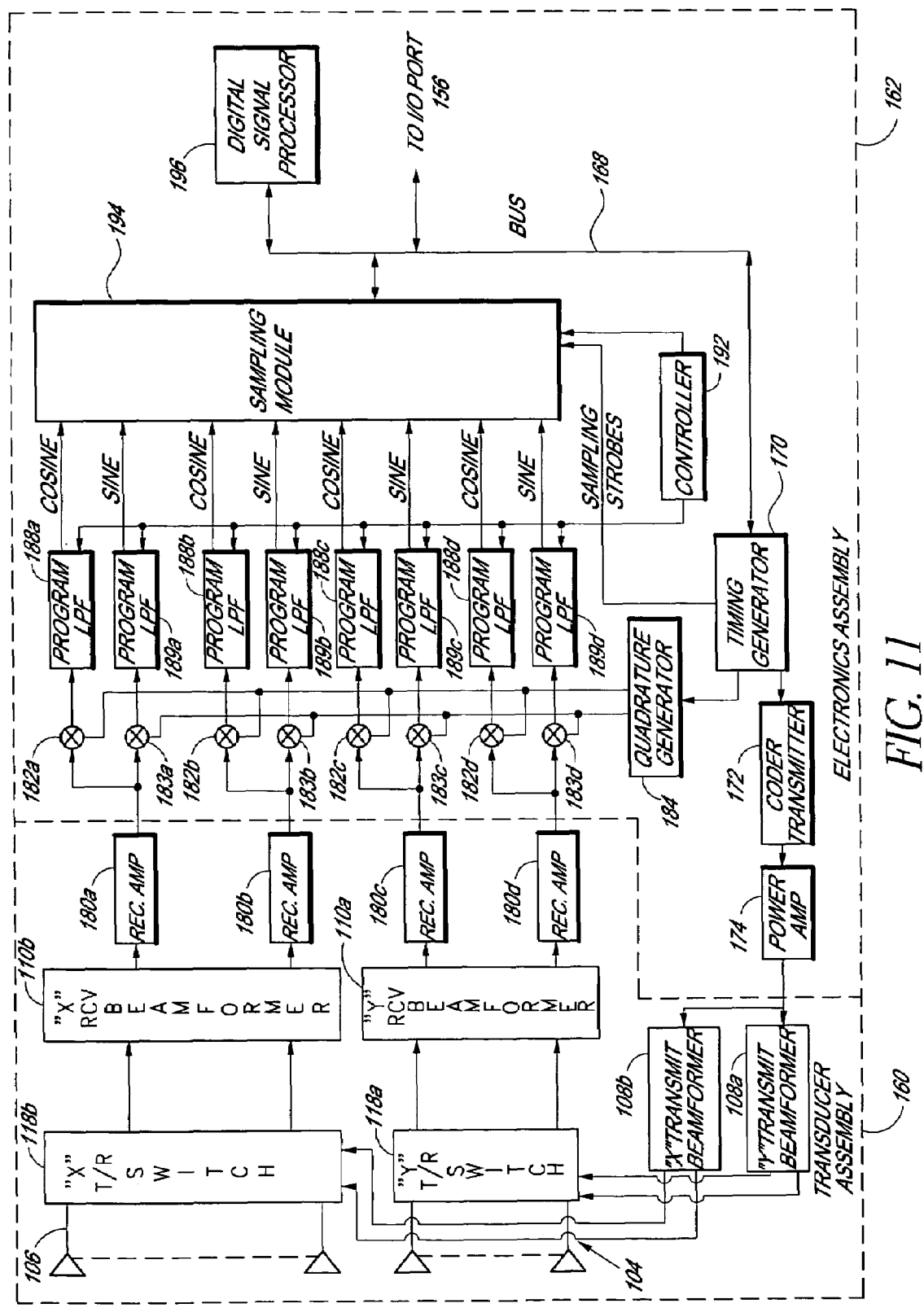
FIG. 11 is a functional block diagram illustrating one embodiment of an ADCP 10 which includes the two-dimensional transducer array of FIG. 5.

FIG. 11 is a functional block diagram illustrating one embodiment of an ADCP 10 including the two-dimensional transducer array of FIG. 5. The electronics can be functionally partitioned into a front-end transducer assembly 160 that receives acoustic signals, and an electronics assembly 162 that coordinates transmitting and receiving, and performs signal processing.

As discussed with regard to FIG. 5, each of the array X axis rows 106 and Y axis columns 104 are connected to a T/R switch 118 which electrically connects the sets of X and Y lines to respective X and Y receive beamformers 110 in the receive mode, and to X and Y transmit beamformers 108 in the transmit mode.

In transmit mode, a coded-pulse transmission is initiated by a digital signal processor 196. The digital signal processor may be a digital signal processor, or any other suitable signal processing circuit, including any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as microcontroller and a programmable gate array. In some embodiments, the digital signal processor 196 may be configured to execute one or more software modules.

A user specifiable set of parameters, including the number of cycles per code element and the code length, is stored in a ROM in the digital signal processor 196. The digital signal processor 196 transfers the waveform specific parameters across a digital bus 168 to a timing generator 170. Under the control of the digital signal processor 196, the timing generator 170 controls a coder transmitter 172 to generate the appropriate pair of coded-pulses, including dead-time. The coded-pulses are amplified by a power amplifier 174 and are eventually transmitted into the water by the transducer array 100 (see FIG. 5) as a coded acoustic waveform.

During some user specified blanking interval, when no pulses are transmitted, echo pulses received from the transducer array 100 are fed from the T/R switch circuits 118a and 118b to a set of receive beamformers 110a and 110b, as discussed with regard to FIG. 5.

In one embodiment, the receiver amplifiers 180 each include a Signetics SA604A semiconductor chip. Although designed for intermediate frequency conversion applications, the two amplifiers (not shown) of the SA604A chip happen to operate over the anticipated frequency range of the current profiler. The amplifiers are connected in series to the output of the beamformers 110a and 110b. The signal strength of the echo is also made available to the system by the receiver amplifiers 180, for example, from the pin 5, RSSI output of the SA604A chip. In one embodiment, the signal strength is digitized and recorded for later processing.

The signal strength signal can be calibrated for use in measuring backscatter strength, particle concentration and particle flux. For example, one application of this type of measurement is in dredging operations where signal strength is used in determining sediment concentration and vertical flux in plumes created by dumping spoil.

The output signals of the receiver amplifiers 180 are fed to a set of in-phase mixers 182a,b,c,d and a set of quadrature mixers 183a,b,c,d. The mixers 182, 183 form the product of the received signal and the carrier signal. More specifically, the mixers 182, 183 are used to heterodyne the received signal so as to translate the carrier signal into a DC signal (where the carrier signal includes an in-phase [cosine] and quadrature [sine] signal, collectively called quadrature signals). In the exemplary embodiment, the mixers 182, 183 are implemented as two 74HC4053 triple two-channel analog multiplexer/demultiplexer chips such as those supplied by Signetics. The quadrature signals are received by the mixers 182, 183 from a quadrature generator 184.

In one embodiment, the quadrature generator 184 includes a pair of D flip-flops (not shown) that are connected in series. The inverted output Q' of a second flip-flop is fed back into the input D of the first flip-flop. In operation, the quadrature generator 184 receives an oscillator signal from the timing generator 170. The oscillator signal is fed into the clock input of two D flip-flops. The in-phase signal is thus sampled from the inverted output Q' of the second flip-flop and the quadrature signal is sampled from the noninverted output Q of the first flip-flop. The quadrature signals are then fed from the quadrature generator 184 to the mixers 182, 183.

The mixers 182,183 feed their respective amplified quadrature signals to a set of programmable low-pass filters 188a,b,c,d and 189a,b,c,d. The low-pass filters 188 are programmed by a controller 192 to pass the sideband frequencies, e.g., up to 20% of the carrier frequency, corresponding to the phase modulation of the coded pulse. The filtered quadrature signals output from the low-pass filters 188, 189 (labeled as cosine and sine channels) are fed into a sampling module 194.

The function of the sampling module 194 is controlled by the controller 192 and the timing generator 170. A receive cycle is initiated by the timing generator 170 at a time after the last element of a code sequence, has been transmitted. After a user programmable delay, to permit the recovery of the receiver electronics in the transducer assembly 160, the timing generator 170 produces a train of sampling strobes that trigger analog-to-digital converters in the sampling module 194. Thus, each sample bit corresponds to one sample of one quadrature component of one of the four waveforms received by the transducer array 100. The digital data is transferred to the digital signal processor (DSP) 196 across the digital bus 168. In the exemplary embodiment, the digital bus 168 is a custom, asynchronous bus having sixteen data lines (BD0-BD15) and twelve address lines (BA1-BA12). In some embodiments, the digital bus 168 can transfer data at speeds up to 400 ns per word.

In some embodiments, the sampling module 194 includes a multi-bit analog to digital converter (ADC) configured to sample each quadrature component of the four waveforms instead of a single bit sample as previously discussed. This approximates a linear sampling of these waveforms.

The DSP 196 calculates the autocorrelation function (R(h)) of the received signal at a predetermined lag corresponding to the number of code elements in the first pulse. The autocorrelation function is used to measure the dependence of a received waveform at time t with the received waveform delayed by a lag time. In the exemplary embodiment, the received signal is a series of samples. Therefore R(h) is used to measure the dependence of this series of samples with the series of samples delayed by h (a predetermined lag represented by an integer sample number). To calculate this function the DSP 196 applies the following equation, independently, for each of the four cosine-sine pairs output by the sampling module 194:

$$R(h) = \sum_j S_j S_{j+h}^* =$$

$$\sum_j [\cos_j \cos_{j+h} + \sin_j \sin_{j+h} + \cos_{j+h} \sin_j i - \cos_j \sin_{j+h} i]$$

Equation 7 where h is a predetermined lag represented by an integer sample number;

j is integer sample numbers within a depth cell of interest;

cosine and sine is data sampled from cosine and sine channels (such as from the low-pass filters 188, 189 in FIG. 11)

$i = (-1)^{1/2}$;

$S_j = j + j i$; and

S* denotes the complex conjugate of S.

In the exemplary embodiment, resolution has been sacrificed for speed and each sample value is represented by one bit. However, it can be shown that only half the information available in the cosine-sine information is lost by using this method.

In this way, the DSP 196 can perform a fast multiply by exclusive-oring two 16-bit data words received from the cosine-sine channels via the sampling module 194. The digital representation of (0,1) is interpreted by the DSP 196 as (−1,+1). Once the multiplies are performed, the summation of products is accomplished using a look-up table stored in EPROM. In the exemplary embodiment, the DSP 196 makes use of a Texas Instruments TMS320vc33 32-bit, digital signal processor chip.

Once the complex number representation of each autocorrelation result is obtained, the DSP 196 then calculates the Doppler frequency $f_D$. For linear systems, it is calculated as follows:

$$f_D = \frac{\tan^{-1}(I/R)}{2\pi hT} \qquad \text{Equation 8}$$

where $f_D$ is the Doppler frequency of the echo;
I is the imaginary part of the complex number;
R is the real part of the complex number;
h is the lag used to calculate the autocorrelation; and
T is the time between samples.

For a hard-limiting system, such as the one shown and described herein, the digital signal processor 196 uses the following Doppler frequency equation:

$$f_D = \frac{\tan^{-1}(\sin[\pi I/2]/\sin[\pi R/2])}{2\pi hT} \qquad \text{Equation 9}$$

In addition, the digital signal processor 196 uses normalized values of I and R in Equation 9 by dividing each by the autocorrelation at zero lag, i.e., the normalized autocorrelation function may be used. Note that for linear systems the normalization step cancels in the division I/R and therefore is unnecessary.

In one alternative embodiment, the digital signal processor 196 calculates orthogonal velocity components based on Equation 1 and then translates these velocities to earth reference values, e.g., subtracting out the components of velocity generated by the ship. In another embodiment, the Doppler frequency and/or other intermediate calculations can be forwarded to a conveying vessel via an I/O port 156. The I/O port 156 is configured to connect to a transmission cable (not shown) for measurements wherein post-processing of current profiles in real-time is desired. In yet another embodiment of the current profiler electronics, the Doppler frequency results can be stored in a recording media such as EEPROM or flash non-volatile that would be added on to the digital bus 168.

In some embodiments, the DSP 196 may further generate a temporal phase shift control signal (see FIG. 7) for each beamformer. In some embodiments, the timing generator 170 may further generate a spatial phase shift control signal (see FIG. 7) for each beamformer.

The acoustic Doppler velocity processing methods described above, when used in a current profiler comprising phased array transducers, do not consider certain bias caused by a velocity component perpendicular to the face of the array (also referred to as "vertical component"). This bias is a result of two separate effects: an uncompensated speed of sound dependence for this velocity component and an error induced by a phase slope unrelated to the Doppler effect. Other velocity processing applications such as radar applications may be subject to similar bias.

In some applications, the spacing of array elements as illustrated in FIG. 6B is a nominal half-wavelength in distance and a quarter-cycle in phase. The quarter-cycle in phase corresponds to a quarter-wavelength of wavefront displacement at the actual (not nominal) sound speed and frequency. The phased array geometry therefore gives the following relationships:

$$d = \frac{1}{2}\lambda_0 = \frac{c_0}{2f_0} \qquad \text{Equation 10}$$

$$\sin\theta = \frac{\lambda}{4d} = \frac{c}{4f_0 d} = \frac{c}{c_0}\frac{f_0}{f_c}\frac{1}{2} = \frac{c}{c_0}\frac{f_0}{f_c}\sin\theta_0 \qquad \text{Equation 11}$$

where d is the spacing of array elements,
$\lambda_0$ is the nominal wavelength,
$\lambda$ is the actual wavelength,
$c_0$=1536 m/s is the nominal sound speed,
c is the actual sound speed (at the transducer),
$f_0$ is the carrier center frequency,
$f_c$ is the centroid frequency of the received spectrum (due to the Doppler shift, receiver bandpass skew, absorption of the water, etc), $\theta_0$=30° is the nominal beam Janus angle, and
θ is the actual beam Janus angle (at the transducer).

In some applications, it is assumed that it is the sound speed at the array rather than at the scatterers that determines the proper scale factor for the Doppler shift, because usually it is the array rather than the scatterers that is moving relative to the water. With this assumption, the measured Doppler shift $f_D$ for one beam will be:

$$f_D = \frac{2}{\lambda}[\pm u\sin\theta + w\cos\theta] \qquad \text{Equation 12}$$

$$= \frac{1}{2d}\left[\pm u + w\sqrt{\left(2\frac{c_0}{c}\frac{f_c}{f_0}\right)^2 - 1}\,\right],$$

where u is the x or y velocity component (parallel to the array face), and w is the z velocity component (perpendicular to the array face).

The vertical velocity may be determined from the sum of the Doppler shifts of opposing beams, for which the u velocity component cancels exactly. However, the scale factor depends upon the sound speed c and the centroid frequency fc. The vertical velocity measurement will be biased if this scale factor is not calculated correctly. The horizontal velocity is determined from the difference of the Doppler shifts of opposing beams. The w velocity component will not cancel exactly if the centroid frequencies $f_c$ are different on different beams. If this phenomenon is not properly accounted for, there will be a bias in the measured u that is approximately proportional to w rather than u.

Removing Bias Caused by Vertical Velocity Component

Figure 12:
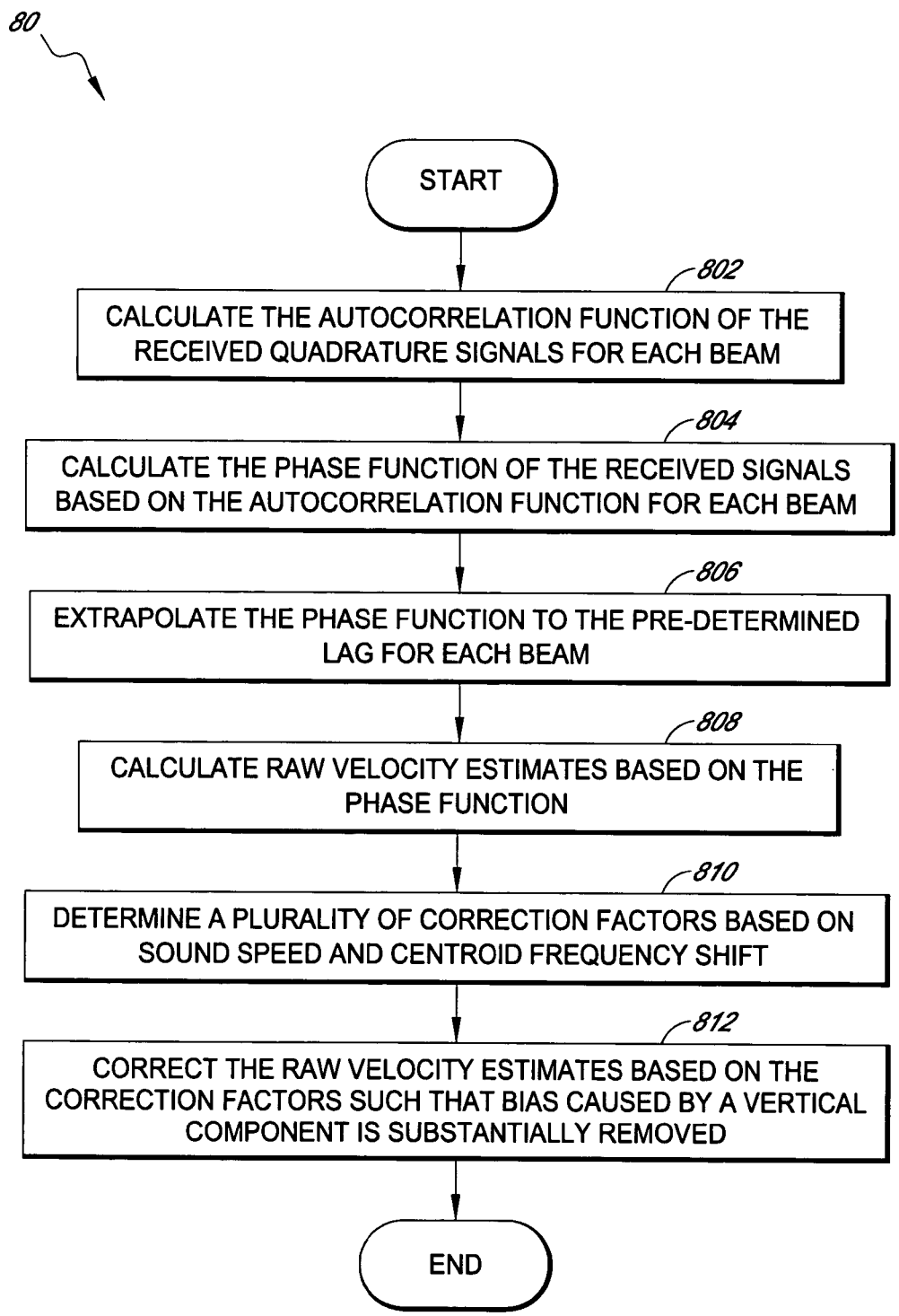
FIG. 12 is a flowchart illustrating one example of a velocity processing method, which substantially removes the bias caused by a vertical component from the velocity estimates.

FIG. 12 is a flowchart illustrating one example of a velocity processing method, which substantially removes the bias caused by a vertical component from the velocity estimates. Depending on the embodiment, certain steps of the method may be removed, merged together, or rearranged in order. In the exemplary embodiment, the method is performed by the DSP 196 (see FIG. 11). The method is applied to the received quadrature phase signals of the returned acoustic energy after transmit.

The method 80 starts at a block 802, wherein the autocorrelation function of the received quadrature signals for each beam is calculated. The received quadrature signals are transferred to the DSP 196 from the sampling module 194 as described above with regard to FIG. 11. The autocorrelation function is calculated by Equation 7 as described above with regard to FIG. 11, except that now h may be any lag represented by an integer sample number.

Next at a block 804, the phase of the autocorrelation function for each beam of the received signals is calculated. For each autocorrelation result, the phase for beam n, $\phi_n$, can be calculated as follows:

$$\phi_n = \tan^{-1}(I/R) \quad \text{Equation 13}$$

where I and R are the imaginary part and real part of the complex number autocorrelation result respectively.

Moving to a block 806, the phase function of the received signals is extrapolated to the predetermined lag (also referred to as nominal lag) for each beam according to Equation 14 as below. If one sample is at the nominal lag, the phase input to Equation 14 for that sample is simply that phase less the transmitted phase offset $\phi_{n,T}$ for that beam, if there is any. The nominal lag depends on the coded pulses sent out. In the exemplary embodiment, coded pulses as illustrated in FIGS. 4a, 4b, and 4c are sent out. In that case, the predetermined lag corresponds to the number of code elements in the first pulse.

$$\phi_n(T_L) - \phi_{n,T} = \frac{\left(\frac{f_0 \Delta \tau_2}{1 + \frac{1}{2}\frac{\Delta \tau_2}{T_L}}\right)\left(\frac{\phi_n(\tau_1) - \phi_{n,T}}{1 + \frac{1}{2}\frac{\Delta \tau_1}{T_L}}\right) - \left(\frac{f_0 \Delta \tau_1}{1 + \frac{1}{2}\frac{\Delta \tau_1}{T_L}}\right)\left(\frac{\phi_n(\tau_2) - \phi_{n,T}}{1 + \frac{1}{2}\frac{\Delta \tau_2}{T_L}}\right)}{\left(\frac{f_0 \Delta \tau_2}{1 + \frac{1}{2}\frac{\Delta \tau_2}{T_L}}\right) - \left(\frac{f_0 \Delta \tau_1}{1 + \frac{1}{2}\frac{\Delta \tau_1}{T_L}}\right)} \quad \text{Equation 14}$$

Where
  $T_L$ is the nominal lag,
  $\phi_n(T_L)$ is the sampled phase at the nominal lag for beam n,
  $\phi_{n,T}$ is the transmitted phase for beam n which is determined by the transmitted coded pulses (in the exemplary embodiment, it equals to zero);
  $f_0$ is the transmitted carrier frequency,
  $\tau_1, \tau_2$ are the sample point immediately before and after the autocorrelation peak respectively,
  $\Delta \tau_1, \Delta \tau_2$ are the distance in the lag from $\tau_1, \tau_2$ to the nominal lag respectively,
  The operation of this extrapolation will be described in further detail with regard to FIG. 13 below.

Next at a block 808, raw velocity estimates at the nominal lag $u_{raw}(T_L)$, $v_{raw}(T_L)$, and $w_{raw}(T_L)$ are calculated based on the phase function as extrapolated in block 806.

$$u_n(T_L) = \frac{d}{2\pi T_L}[\phi_n(T_L) - \phi_{n,T}] \quad \text{Equation 15}$$

$$u_{raw}(T_L) = u_1(T_L) - u_2(T_L) \quad \text{Equation 16}$$

$$v_{raw}(T_L) = u_4(T_L) - u_3(T_L) \quad \text{Equation 17}$$

$$w_{raw}(T_L) = \left(\frac{1}{\sqrt{12}}\right)\sum_{n=1}^{4} u_n(T_L) \quad \text{Equation 18}$$

$$e_{raw}(T_L) = \left(\frac{1}{\sqrt{2}}\right)[u_1(T_L) + u_2(T_L) - u_3(T_L) - u_4(T_L)] \quad \text{Equation 19}$$

Where
  d is the spacing of array elements,
  $e_{raw}(T_L)$ is a raw velocity error estimate indicating the quality of the velocity estimates; it is optional to either include or exclude this error estimate in calculation.

Moving to a block 810, a plurality of correction factors are determined based on sound speed and centroid frequency shift. The centroid frequency of beam n, $f_{n,low}$, is estimated as follows:

$$\frac{f_{n,low}}{f_0} = 1 + \frac{\left(\frac{\phi_n(\Delta \tau_2) - \phi_{n,T}}{2\pi\left(1 + \frac{1}{2}\frac{\Delta \tau_2}{T_L}\right)}\right) - \left(\frac{\phi_n(\Delta \tau_1) - \phi_{n,T}}{2\pi\left(1 + \frac{1}{2}\frac{\Delta \tau_1}{T_L}\right)}\right)}{\left(\frac{f_0 \Delta \tau_2}{1 + \frac{1}{2}\frac{\Delta \tau_2}{T_L}}\right) - \left(\frac{f_0 \Delta \tau_1}{1 + \frac{1}{2}\frac{\Delta \tau_1}{T_L}}\right)} \quad \text{Equation 20}$$

$$\varepsilon_n = \frac{c_0}{c}\frac{f_{n,low}}{f_0} - 1 \quad \text{Equation 21}$$

A plurality of correction factors is then calculated:

$$F_{12} \equiv \left(\sqrt{\frac{1}{12}(1+\varepsilon_1)^2 - \frac{1}{48}} + \sqrt{\frac{1}{12}(1+\varepsilon_2)^2 - \frac{1}{48}}\right) \cong \quad \text{Equation 22}$$

$$\frac{(5 + 1.5\varepsilon_1)(10 + 3\varepsilon_2) - 32}{(6+\varepsilon_1)(6+\varepsilon_2)}$$

$$F_{34} \equiv \left(\sqrt{\frac{1}{12}(1+\varepsilon_3)^2 - \frac{1}{48}} + \sqrt{\frac{1}{12}(1+\varepsilon_4)^2 - \frac{1}{48}}\right) \cong \quad \text{Equation 23}$$

$$\frac{(5 + 1.5\varepsilon_3)(10 + 3\varepsilon_4) - 32}{(6+\varepsilon_3)(6+\varepsilon_4)}$$

Next at a block 812, the raw velocity estimates are corrected based on the correction factors such that bias caused by a vertical velocity component is substantially removed. The vertical velocity component w is first corrected as follows:

$$w = \frac{w_{raw}(T_L)}{F_{12} + F_{34}} \quad \text{Equation 24}$$

Then the horizontal velocity estimates u and v are corrected. The calculation of the error velocity estimate e is optional and may be excluded in some embodiments.

$$u = u_{raw} + \left(\sqrt{(1+\varepsilon_2)^2 - \frac{1}{4}} - \sqrt{(1+\varepsilon_1)^2 - \frac{1}{4}}\right)w \cong \quad \text{Equation 25}$$

$$u_{raw} + \left[\frac{\sqrt{1728}\,(\varepsilon_2 - \varepsilon_1)}{(6+\varepsilon_1)(6+\varepsilon_2)}\right]w$$

$$v = v_{raw} + \left(\sqrt{(1+\varepsilon_3)^2 - \frac{1}{4}} - \sqrt{(1+\varepsilon_4)^2 - \frac{1}{4}}\right)w \cong \quad \text{Equation 26}$$

$$v_{raw} + \left[\frac{\sqrt{1728}\,(\varepsilon_3 - \varepsilon_4)}{(6+\varepsilon_3)(6+\varepsilon_4)}\right]w$$

-continued $$e = e_{raw} - \left(\sqrt{\frac{1}{6}(1+\varepsilon_1)^2 - \frac{1}{24}} + \sqrt{\frac{1}{6}(1+\varepsilon_2)^2 - \frac{1}{24}} - \sqrt{\frac{1}{6}(1+\varepsilon_3)^2 - \frac{1}{24}} - \sqrt{\frac{1}{6}(1+\varepsilon_4)^2 - \frac{1}{24}}\right)w$$

$$= e_{raw} + \sqrt{2}\,(F_{34} - F_{12})w$$

Equation 27

The above-described equations 24-26 may be applied when at least four beams are received correctly. In case only three beams are received correctly, the raw velocity estimates may be corrected based on the correction factors as follows:

$$w = \begin{cases} \left(\dfrac{u_3 + u_4}{\sqrt{12}\,F_{34}}\right), & \text{beam 1 or 2 bad} \\ \left(\dfrac{u_1 + u_2}{\sqrt{12}\,F_{12}}\right), & \text{beam 3 or 4 bad} \end{cases}$$

Equation 28

$$u = \begin{cases} -2u_2 - \sqrt{3}\,w, & \text{beam 1 bad} \\ 2u_1 - \sqrt{3}\,w, & \text{beam 2 bad} \end{cases}$$

Equation 29

$$v = \begin{cases} 2u_4 - \sqrt{3}\,w, & \text{beam 3 bad} \\ -2u_3 - \sqrt{3}\,w, & \text{beam 4 bad} \end{cases}$$

Equation 30

FIGS. 13a and 13b illustrate the operation of extrapolating the phase function of the received signals to the nominal lag for each beam according to Equation 11 in FIG. 12. FIG. 13a is a two-dimensional graph of an autocorrelation function. The vertical axis represents the amplitude of the autocorrelation between samples while the horizontal axis represents the time lag between samples. As illustrated, $\tau_1$, $\tau_2$ are the sample point immediately before and after the autocorrelation peak respectively. FIG. 13b is a two-dimensional graph of the sampled phase of the autocorrelation between samples. The vertical axis represents the sampled phase while the horizontal axis represents the time lag t between samples. It should be noted that the sampled phase $\phi_n(t)$ in FIG. 13b has been adjusted such that $\phi_{n,T}$, the transmitted phase for beam n, has been removed. The extrapolation operation is simply to draw a straight line connecting point a (representing the sampled phase at $\tau_1$) and point b (representing the sampled phase at $\tau_2$) and find the intersection point c of line a-b and the line described by the function $t=T_L$ (where t represents lag). The sampled phase of the point c is $\phi(T_L)$.

The velocity processing methods described herein may be used to measure various types of velocities depending on the particular application. Some of the examples may include, but not limited to, measuring the velocity of a vehicle or vessel relative to the bottom or surface of a fluid body, measuring the velocity of current in an gas medium, and measuring the velocity of a target (such as in radar applications).

Further background information on this invention may be found in U.S. Pat. Nos. 5,483,499 and 5,808,967, each of which is incorporated by reference hereby in its entirety.

The foregoing description details certain embodiments of the invention. It will be appreciated, however, that no matter how detailed the foregoing appears in text, the invention can be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A method of measuring velocity in a fluid medium utilizing a phased array transducer, the phased array transducer comprising a plurality of transducer elements arranged to form a single two-dimensional array, the method comprising:
   receiving echoes of a plurality of beams generated by the transducer;
   calculating raw velocity estimates based at least in part on the echoes; and
   removing substantially a bias related to a first velocity from the raw velocity estimates, the first velocity being orthogonal to the face of the two-dimensional array.

2. The method of claim 1, wherein the bias comprises a bias related to sound speed in a fluid medium.

3. The method of claim 1, wherein the bias comprises a bias independent of Doppler effect.

4. The method of claim 1, where the measured velocity is the velocity of currents in a fluid medium.

5. The method of claim 1, where the measured velocity is the velocity of a vehicle or vessel relative to the bottom or surface of the fluid medium.

6. The method of claim 1, where the measured velocity is the velocity of a target.

7. The method of claim 1, wherein the removing further comprises:
   determining one or more correction factors based at least in part on sound speed and/or a centroid frequency shift of one or more of the echoes; and
   correcting the raw velocity estimates based on the one or more correction factors.

8. The method of claim 1, wherein the calculating of raw velocity estimates further comprises:
   calculating the autocorrelation function of the echo of each beam; and
   extrapolating the phase of the autocorrelation function to a pre-determined lag for each beam.

9. A signal processing circuit adapted for incorporation in a device configured to measure velocity, the signal processing circuit being configured to perform the method of claim 1.

10. A system configured to measure velocity, comprising:
    a phased array transducer comprising a plurality of transducer elements arranged to form a single two-dimensional array, the transducer being configured to generate a plurality of beams and to receive echoes of the beams; and
    a processing module configured to calculate raw velocity estimates based at least in part on the echoes and to remove substantially a bias related to a first velocity from the raw velocity estimates, the first velocity being orthogonal to the face of the two-dimensional array.

11. A system configured to measure velocity, comprising:
    means for generating a plurality of beams and receive echoes of the beams, wherein the means comprises a phased array transducer, the phased array transducer comprising a plurality of transducer elements arranged to form a single two-dimensional array; and
    means for calculating raw velocity estimates based at least in part on the echoes; and
    means for removing substantially a bias related to a first velocity from the raw velocity estimates, the first velocity being orthogonal to the face of the two-dimensional array.

12. The method of claim 1, wherein the removing of substantially a bias related to a first velocity from the raw velocity estimates comprises subtracting a correction term proportional to the first velocity from each of the raw velocity estimates.

13. The method of claim 12, wherein the correction term for at least one raw velocity estimate is different from the correction term for another raw velocity estimate.

14. The system of claim 10, wherein the processing module is configured to subtract a correction term proportional to the first velocity from each of the raw velocity estimates.

15. The system of claim 14, wherein the correction term for at least one raw velocity estimate is different from the correction term for another raw velocity estimate.

* * * * *

UNITED STATES PATENT AND TRADEMARK OFFICE
CERTIFICATE OF CORRECTION

PATENT NO. : 7,542,374 B2
APPLICATION NO. : 11/540997
DATED : June 2, 2009
INVENTOR(S) : Brumley et al.

It is certified that error appears in the above-identified patent and that said Letters Patent is hereby corrected as shown below:

On Column 7, Line 52, delete "crossection)." and insert --cross section).--, therefor.

On Column 11, Line 22, delete "$\sqrt{\vec{2}}$" and insert -- $\sqrt{2}$ --, therefor.

On Column 14, Line 54, delete "$S_j=_j+_ji;$" and insert --$S_j=\cos_j+\sin_j i;$--, therefor.

On Column 14, Line 63, delete "exclusive-oring" and insert --exclusive-ORing--, therefor.

On Column 16, Line 22, delete "$\theta_0=30°$ is the nominal beam Janus angle," and insert the same before "and" on Col. 16, Line 23, therefor.

On Column 16, Line 47, delete "fc." and insert --$f_c$.--, therefor.

On Column 17, Line 47, delete "respectively," and insert --respectively.--, therefor.

Signed and Sealed this

Sixth Day of April, 2010

David J. Kappos
*Director of the United States Patent and Trademark Office*